United States Patent [19]
Garcia et al.

[11] Patent Number: 5,982,365
[45] Date of Patent: Nov. 9, 1999

[54] SYSTEM AND METHODS FOR INTERACTIVELY GENERATING AND TESTING HELP SYSTEMS

[75] Inventors: Carlos J. Garcia, Pittsburg; David K. Simerly, Watsonville, both of Calif.

[73] Assignee: Apple Computer, Inc., Cupertino, Calif.

[21] Appl. No.: 08/664,166

[22] Filed: Jun. 14, 1996

Related U.S. Application Data

[63] Continuation of application No. 08/154,979, Nov. 19, 1993, abandoned.

[51] Int. Cl.⁶ .................................................. G06F 15/00
[52] U.S. Cl. ........................ 345/336; 707/102; 395/200.3
[58] Field of Search ................................... 345/333, 334, 345/336, 337, 338, 339, 340; 707/501, 102, 103, 104; 395/712, 200.3, 200.43, 200.59, 200.6

[56] References Cited

U.S. PATENT DOCUMENTS

| | | | |
|---|---|---|---|
| 4,764,867 | 8/1988 | Hess | 395/160 |
| 4,982,344 | 1/1991 | Jordan | 395/157 |
| 4,992,972 | 2/1991 | Brooks et al. | 364/900 |
| 5,103,498 | 4/1992 | Lanier et al. | 395/68 |
| 5,121,497 | 6/1992 | Kerr et al. | 395/650 |
| 5,122,972 | 6/1992 | Richard et al. | 395/157 |
| 5,155,806 | 10/1992 | Hoeber et al. | 395/157 |
| 5,165,012 | 11/1992 | Crandall et al. | 395/157 |
| 5,235,679 | 8/1993 | Yoshigawa et al. | 395/156 |
| 5,297,249 | 3/1994 | Bernstein et al. | 395/156 |
| 5,307,456 | 4/1994 | Mackay | 395/154 |
| 5,361,361 | 11/1994 | Hickenan et al. | 395/700 |
| 5,377,319 | 12/1994 | Kitahara et al. | 395/161 |
| 5,388,993 | 2/1995 | McKiel et al. | 434/118 |
| 5,395,243 | 3/1995 | Lubin et al. | 434/118 |
| 5,428,731 | 6/1995 | Powers, III | 395/154 |
| 5,434,963 | 7/1995 | Kuwamoto et al. | 395/155 |
| 5,442,759 | 8/1995 | Chiang et al. | 395/375 |
| 5,825,355 | 10/1998 | Palmer et al. | 345/336 |

OTHER PUBLICATIONS

"Hypertext, an introduction and survey", Jeff Conklin, Sep. 1987, pp. 17–41.
Macromedia, Inc., "Action! User Guide", 1992, pp. i–252.

*Primary Examiner*—Ba Huynh
*Attorney, Agent, or Firm*—Carr & Ferrell LLP

[57] ABSTRACT

An authoring system for interactively generating and testing help systems preferably comprises a central processing unit (CPU), a display device, an input device, a data storage device and a memory. The memory further comprises a code generator, display routines, linking routines, indexing routines, a plurality of topic records, a plurality of table records and a plurality of graphic files. The present invention stores the information explaining the features and functionality of an application program in topic records. The authoring system of the present invention uses the topic records for organization and for displaying the data to the user. The CPU under direction of routines in the memory displays the contents of each topic record using the graphic files, and creates, updates and deletes topic records. The display routines are also used in conjunction with test routines to display the data as it will be presented by the help system during operation. Methods for creating, revising and testing help systems include: methods for creating, deleting and editing topic records in a help system; methods for creating, deleting and editing links between topic records in a help system; methods for inserting, deleting and editing objects in a topic record of a help system; methods for creating, deleting and editing tables in a help system; and methods for producing the help system from the topic records.

30 Claims, 20 Drawing Sheets

SYSTEM AND METHODS FOR INTERACTIVELY GENERATING AND TESTING HELP SYSTEMS

RELATED APPLICATIONS

This is a continuation of co-pending application Ser. No. 08/154,979 filed on Nov. 19, 1993.

BACKGROUND OF THE INVENTION

1. Field of the Invention

The present invention relates generally to "help systems" for application programs operating on computers. In particular, the present invention relates to a system and methods for interactively generating and testing help systems. Still more particularly, the present invention relates to a system that automatically generates a help system from topic records.

2. Description of the Related Art

The use of personal computers has become widespread for a variety of functions in business and education. Along with the proliferation of computers, the number of computer programs has also increased dramatically. The number of programs currently available has become so great that it is difficult for the user to recognize and utilize the full capabilities of each computer program. In many instances the menus, keystrokes and icons used for each program are different. Thus, even if the user knows the functions or operations the program can perform, the user may not be able to execute a function because the icon, menu or keystroke to activate a function is not known. Such usability problems are only increased with each new generation of application programs. Typically, in each new version of an application program, additional functionality is included. Each new version provides a series of new features that the user has at his disposal. However, such additional features make the application more complicated and thus more difficult for the user to fully utilize.

In an attempt to make application programs easier to learn and to fully utilize their functionality, "help systems" have been incorporated into many application programs. Help system is used to refer to a system that operates concurrently with an application program. Each help system is unique to its associated application program and provides an explanation of the functions or significance of icons, menus, commands or other features of the application program. The help systems are typically incorporated into an application program such that they may be selectively employed by the user for explanations of program features while the program is being used.

One problem with existing methods for creating help systems is that they require significant amounts of time and resources. In particular, they require significant amounts of time from highly skilled programmers. Help systems are complicated self-contained programs that must operate independently and concurrently with the application program. Help systems provide a variety of information to the user to explain the program's functionality. Each explanation, format of the explanation, and presentation of the explanation provided by the help system must be directly programmed. For example, the simple process of displaying text of a particular format and size must be specifically detailed in operation steps by programmers when the help system is created. Thus, there is a need for a system and methods that allow help systems to be created in less time and with less understanding of computer programming.

Another problem in creating a help system using the prior art methods is that changes are very difficult to make. Each time a change is made to the help system, the help system must be rewritten, tested and re-compiled to insure that changes to the help system have not affected the operation of other portions of the help system. Moreover, the changes, like the creation of the system itself, must be made directly, thus, highly skilled personnel, as well as a search of the entire help system to locate the appropriate place to make the changes, are required. Therefore, making any changes to a help system is difficult and time consuming.

The prior art has attempted to resolve the problems in creating help systems with a variety of systems referred to as code generators. Such code generators remove some of the difficulty in creating help systems by providing a series of pseudo or formatting codes for performing operations that are common to all help systems. For example, the code generators provide a code for displaying text in centered alignment and a code for text in bold. However, even with such systems, creating help systems continues to be time consuming. With such code generators the syntax must be known and typographical errors and human errors will prevent the help systems from being generated. Because of the use of special codes, the users must be highly skilled and well versed in programming concepts as well as in the code generators themselves. Thus, there continues to be a need for a system and methods for generating and testing help systems that operate in a WYSIWYG (What You See Is What You Get) environment for ease of use.

Therefore, there is a need for a system and methods for automatically generating help systems for computer application programs that significantly simplify the process of writing and testing help systems. Moreover, there is a need for a system and method that can be used interactively, and that provide an interface and structure that make help systems easy to create.

SUMMARY OF THE INVENTION

The present invention overcomes the limitations and shortcomings of the prior art with an authoring system and method for interactively generating and testing help systems. The authoring system of the present invention includes a central processing unit (CPU) that connects with a display device, an input device, a data storage device, and memory. The memory advantageously comprises: a code generator, display routines, linking routines, indexing routines, a list of topic records, a list of table records and a plurality of graphic files. The routines in the memory are used by the CPU to provide an authoring system for generating help systems. The authoring system of the present invention stores the information explaining the features and functionality of an application program in topic records. Each topic record preferably includes a plurality of fields including formatting data, links and other types of data. Each topic record is preferably used to describe one feature of the application program for which the help system is designed. The authoring system of the present invention uses the topic records for organization and for displaying the data to the user. The CPU under direction of routines in the memory displays the contents of each topic record using the graphic files. The display routines are also used in conjunction with test routines to display the data as it will be presented by the help system during operation. The CPU also uses the routines in memory to create, update and delete topic records. The authoring system of the present invention for generating help systems is particularly advantageous because it is easy to use, it stores the help system information, and it operates in a WYSIWYG manner.

The present invention also comprises methods for creating, revising and testing help systems. The preferred embodiment of the present invention comprises several methods including: methods for creating, deleting and editing topic records in a help system; methods for creating, deleting and editing links between topic records in a help system; methods for inserting, deleting and editing objects in a topic record of a help system; methods for creating, editing and deleting a tables in a help system; and methods for testing links, tables and pictures.

DETAILED DESCRIPTION OF THE PREFERRED EMBODIMENTS

Figure 1:
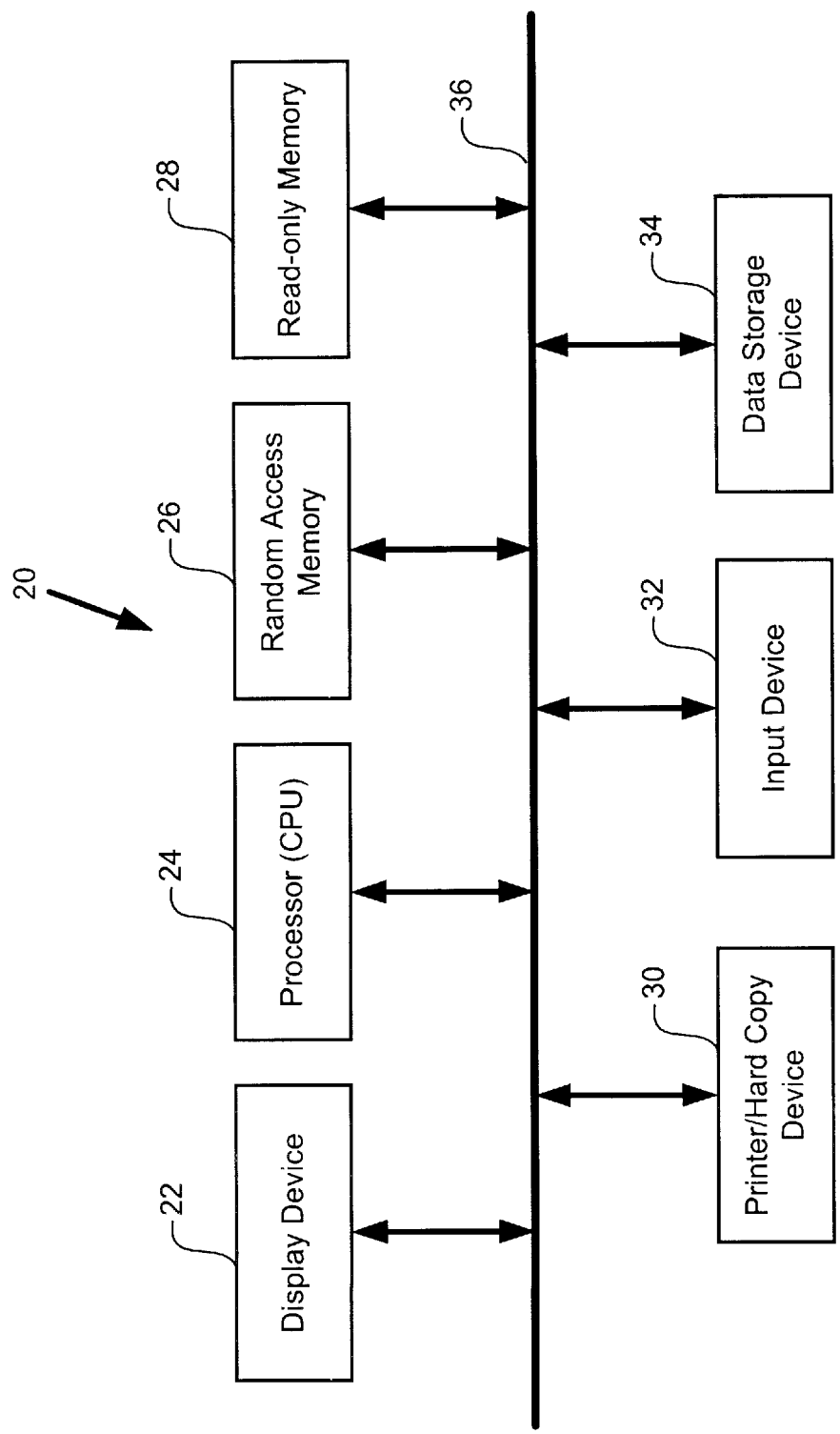
FIG. 1 is a block diagram of a preferred embodiment of an authoring system of the present invention for interactively generating and testing help systems.

Referring now to FIG. 1, a block diagram of a preferred embodiment of an authoring system 20 constructed in accordance with the present invention is shown. The authoring system 20 preferably comprises a central processing unit (CPU) 24 that connects with a display device 22, random access memory (RAM) 26, read-only memory (ROM) 28, a hard copy device 30, an input device 32, and a data storage device 34. The central processing unit (CPU) 24, display device 22, input device 32, and memory 26, 28 are coupled in a von Neuman architecture via a bus 36 such as a personal computer. The central processing unit 24 is preferably a microprocessor such as a Motorola 68040; the display device 22 is preferably a video monitor; and the input device 32 is preferably a keyboard and mouse type controller. The CPU 24 is also coupled to a hard copy device 30 such as a laser printer, and a data storage device 34 in a conventional manner. In an exemplary embodiment, the authoring system is a Macintosh Quadra 800. Those skilled in the art will realize that the authoring system 20 could also be implemented as an IBM personal computer.

The authoring system 20 of the present invention displays a variety of images that are used to simplify the process of creating and testing help systems. The CPU 24, under the guidance of instructions received from the memory 26, 28 and from the user through the input device 32, provides signals for the display of data on the display device 22. The memory 26 preferably includes an operating system 40, a code generator 42, display routines 44, linking routines 46, indexing routines 48, topic records 50, table records 52, and graphic files 54. The authoring system 20 preferably stores the data forming the help system being created in topic records 50. Once the data for the help system is stored in topic records 50, the other routines of the present invention may be used to edit, delete or create new topic records 50. The code generator 42 is then used to create the help system from the topic records 50. Those skilled in the art will realize that various equivalent combinations of devices can achieve the same results when used in accordance with the present invention. For example, while the memory blocks 40, 42, 44, 46, 48, 50, 52, 54 are shown as separate, they can easily comprise different regions of a contiguous space in memory.

The operating system 40 is preferably a conventional personal computer operating system such as System 7.1 for the Macintosh by Apple Computer. Alternatively, the present invention could use a conventional operating system such as DOS and Windows sold by Microsoft Corporation.

The code generator 42 is preferably a system for generating the object code that forms the help system and that can be incorporated into an application program. The code generator 42 includes an object code generator and additional routines for translating the topic records 50 into source code. The additional routines produce source code that is used by the object code generator, as will be discussed in more detail below. The source code provided to the object code generator is converted into a display system in object code format. The code generator 42 preferably produces a system including a display engine and an application program for handling the display of documents on the display device, and for interpreting user input via a mouse and/or keyboard. In particular, the code generator preferably produces a system that can display video, pictures, sound and text, as well as handle links between topics, context sensitive windows, pop-up notes, clipboard interaction and printing of topics under user control. In an exemplary embodiment, the object code generator is an Ehelp compiler made by Foundation Solutions for the Macintosh platform or a Winhelp compiler made by Microsoft Corporation for the Windows platform.

Figure 3:
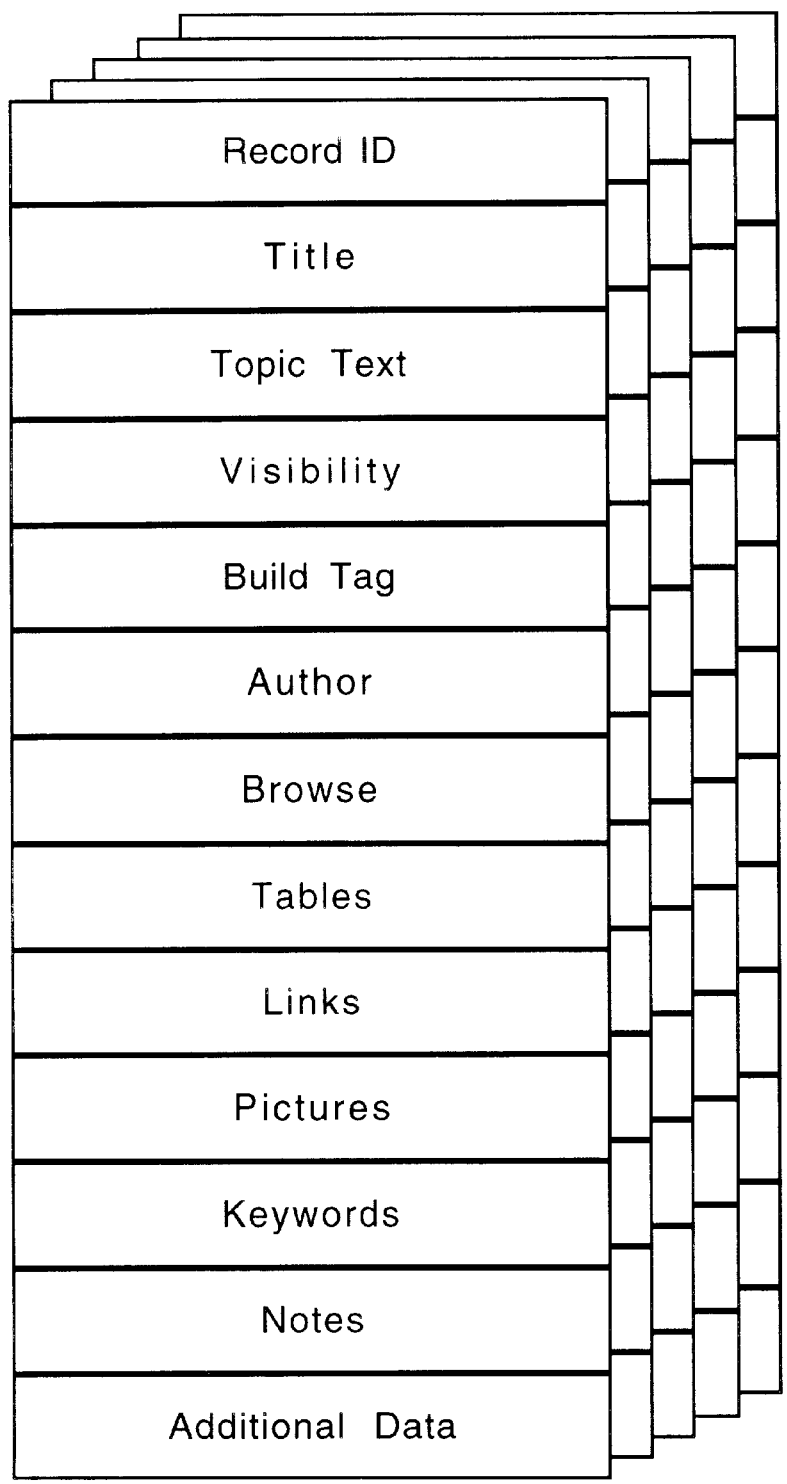
FIG. 3 is a diagram of the preferred embodiment for each of the topics used by the authoring system of the present invention.

The present invention preferably stores the data defining the help system in topic records 50. A preferred embodiment for a topic record 50 is shown in FIG. 3. The use of topic records 50 is particularly advantageous because it provides a structure that is easy to understand and easy to use when explaining the features of an application program. The use of topic records 50 also provides a structure that is very flexible and adaptable to a variety of application programs. Each topic record 50 preferably stores information explaining one feature of the application program, and also information about the format, style and other characteristics to be used when presenting the explanation to the user. In the preferred embodiment, each topic record 50 provides the following fields: a record ID field, a title field, a topic text field, a visibility field, a build tag field, an author field, a browse field, a tables field, a links field, a pictures field, a keywords field, and a notes field. Each topic record 50 preferably includes a style types field (not shown). The style types field is used store a list of the types of styles that are used in the text field as well as the locations where the selected styles are used. In addition to the normal styles, fonts and formats for text, the present invention provides special style types for setting apart objects when their associated text is displayed. Those skilled in the art will realize that other fields may be added to each topic record 50 as shown in FIG. 3. For example, other fields may be added to store video or sound information associated with a topic record 50. The topic records 50 are preferably stored in memory 26 as a last-in-first-out stack.

The record ID field is used to a store an alphanumeric value that uniquely identifies the record.

The title field is used to store a string of characters input by the user during the process of creating and testing the help system. The title field is also displayed to the user to identify and reference the topic record 50. In most instances the user inputs unique names for the topic records 50 for identification purposes.

The topic text field is used to store a string of characters describing the functionality of the feature to which the topic record 50 relates. The style and format for the string stored in the topic text field is also used to format the string when the object code for the help system is generated. In many instances, the help system merely provides a written description of the feature or function provided by the application program. This written description of functionality is stored in the topic text field.

The visibility field is used to store a Boolean value indicating whether the topic title should be displayed in the list of topics. The authoring system 20 uses the values stored in the visibility field when compiling the list of topics for display.

The build tag field is used to store a value for each version of the help system. For example, an application program may be developed for two different platforms such as the Macintosh and Windows. The functionality in the version of the application program for the Macintosh platform may be different in certain aspects as compared with the functionality in the version of the application program for the Windows platform. Therefore, each topic record 50 that relates to both platforms may have a first build tag value; each topic record 50 that relates only to the Windows platform will have a second build tag value; and each topic record 50 that relates only to the Macintosh platform will have a third build tag value. Therefore, the help system for the Windows platform can be created using the topic records with first and second build tag values, and the help system for the Macintosh platform can be created using the topic records with the first and third build tags values. This greatly reduces the amount of work that is required to create a help system when an application program is ported to another platform.

The author field is used to store a string of characters displayed to the user to identify the author of the topic record 50 during the process of creating and testing the help system. The author field preferably comprises a string forming a name, but may also store other codes used for identifying an author.

The browse field preferably stores a browse number and a browse constant for each topic record 50. The browse field allows the user to group topic records 50 together, and provides an additional layer of organization for complex help systems that include many topic records 50. For example, a series of topic records 50 related to different aspects of a feature of the application program may all have the same browse constant for grouping them together, yet each of them may be individually identifiable by the browse sequence number specifying the location of the topic record 50 within the group.

The tables field is used to store a reference to a table that must be created from a table record 52 also stored in memory 26. The table field identifies a table record 52 that is associated with the information stored in the topic text field. The table records 52 are preferably stored in memory 26 as a last-in-first-out stack. Each table record preferably stores the data for the table, an identifying string, and a picture of the table used by the code generator 42. The present invention is particularly advantageous because it provides a mechanism for storing table data and also provides display routines for WYSIWYG editing of the tables before the object code is generated.

The links field is used to store references to other topic records 50 that are linked to this topic record 50. Links are selectable regions of text or graphics that cause another topic record 50 to be jumped to and displayed, or popped up on the display using a window. In the preferred embodiment, links can be jumps or pop ups. The links field includes data referencing the records to and from which the topic record 50 is connected. Upon creation of the help system, these links are converted into procedures for presentation of the topic data to the user in the format specified by the author of the help system.

The picture field is used to store a reference to a picture. The picture referenced in the picture field is preferably a file of pixel data for presentation on the display device 22. The picture can be displayed alone or in conjunction with text.

The keywords field is used for storing keywords for accessing and displaying the data in the topic record 50. The keywords are look up words or phrases that the end user may use to find a feature or function of an application program. The keywords are merged into a list and can be found in alphabetical order. During operation of the created help system, the keywords are compiled and presented to the user. The user may select a keyword and the corresponding topic record information is displayed on the display device.

Finally, the notes field is used for storing the comments of the person creating the help system. These comments can be a valuable tool when testing and modifying the records to generate a help system for a new version of an application program.

Figure 2:
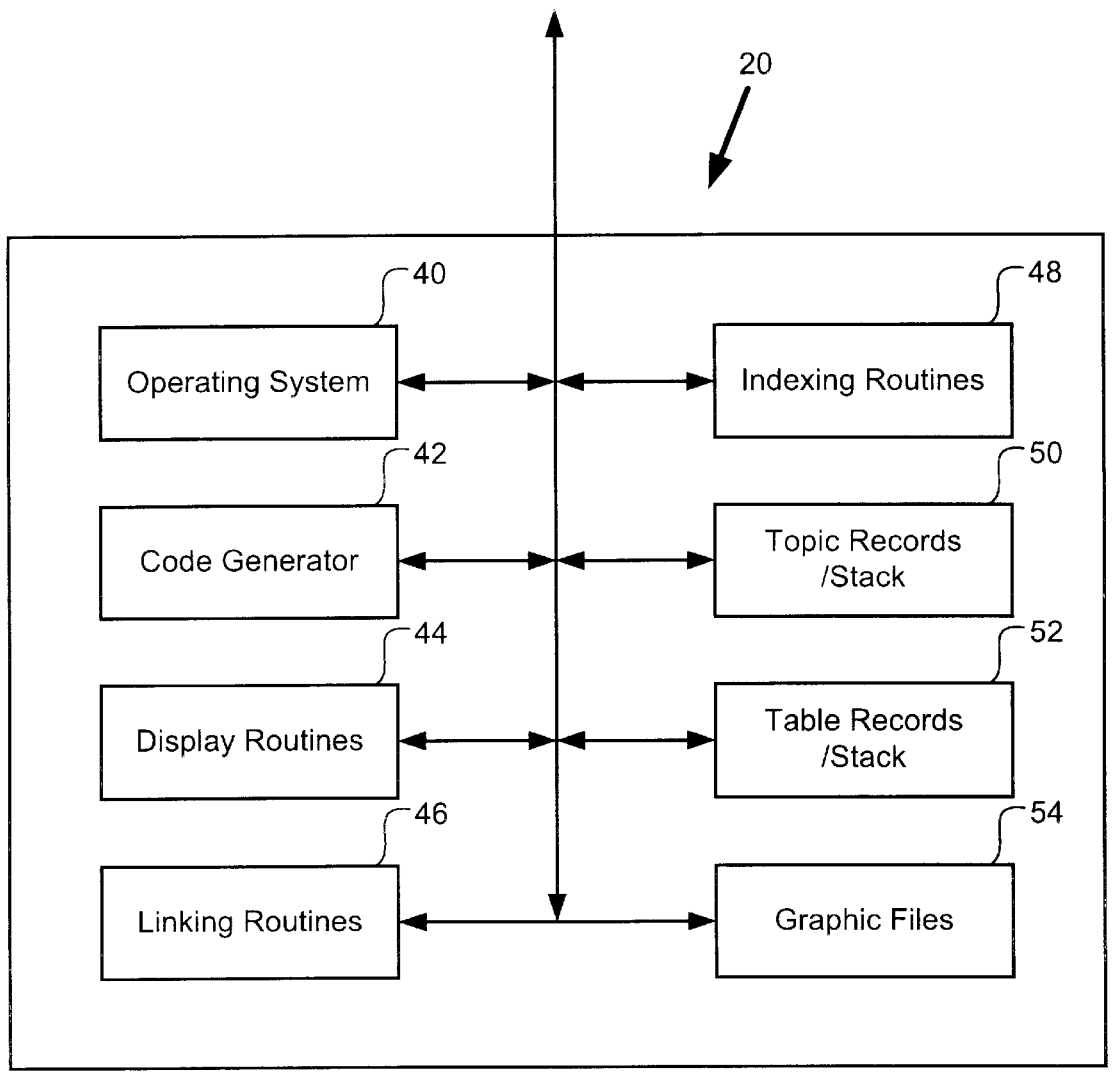
FIG. 2 is a block diagram of a preferred embodiment of the memory of the present invention for interactively generating and testing help systems.

Referring back to FIG. 2, it can be seen that the memory 26 includes display routines 44, linking routines 46, indexing routines 48, table records 52, and graphic files 54. The display routines 44 are used to control the CPU 24 for displaying topic record data and other data as detailed in FIGS. 14–21. The display routines 44 are used with the graphic files 54 to present the data to the user in a WYSIWYG manner. The linking routines 46 are used to store information in the topic records 50 to provide links between records. As detailed below, the present invention includes routines for creating, editing and deleting links between topic records 50. The indexing routines 48 of the memory 26 allow the authoring system 20 to index the topic records 50. For example, these routines 48 are used by the authoring system 20 to prepare a list of topic records 50 within the authoring system 20. The indexing routines 48 use one or more of the fields of the topic record 50. For example, the topic records 50 can be located from their build tag, browse constant, title or author. The indexing routines 48 are also used to compile statistics on the use and access of particular help topics and to keep track of the topic records 50 generally. The indexing routines 48 are used if the user request statistics for the display of the topic records 50 and their connections/links, if any, to other topic records 50. The table records 52 are similar to the topic records 50, but used to store information for tables, their formats and other data used to create the tables.

Figure 4:
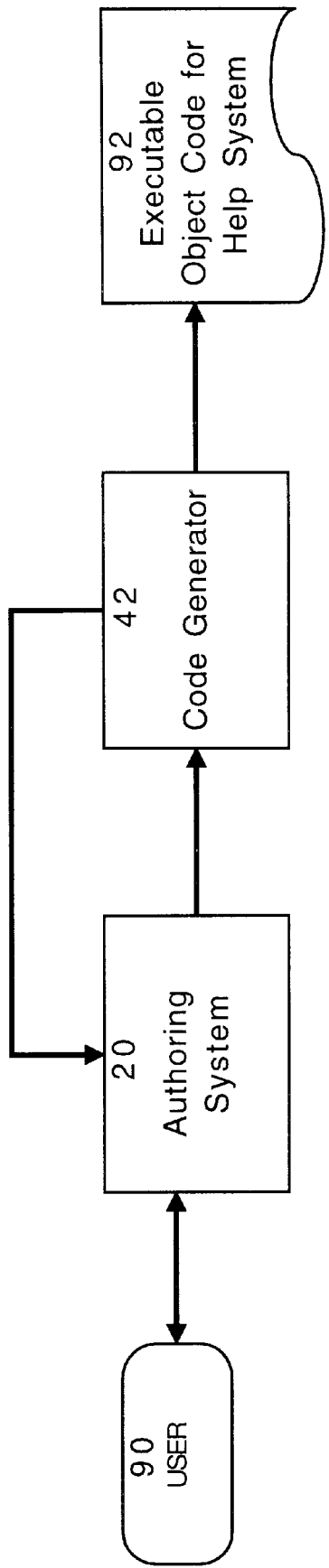
FIG. 4 is a diagram of the operation of the authoring system of the present invention for interactively generating and testing help systems.

Referring now to FIG. 4, an overview of the preferred method for creating and testing help systems using the authoring system 20 of the present invention is shown. The preferred method begins with a user 90 inputting data forming a help system using the authoring system 20 of the present invention. The user 90 interacts with the authoring system 20 using the input device 32 and the display device 22. The CPU 24 under control of the routines stored in memory 26 presents to the user 90 a variety of display screens that allow the user 90 to input text for the help system, format the text, and specify links or associations between topic records 50. The user 90 can also input any use of sound, video or pict files. The authoring system 20 of the present invention is particularly advantageous because it provides a user interface that greatly simplifies the process of creating a help system. Once a portion or the entire help system has been created, topic records 50 are passed to the code generator 42. The code generator 42 uses the topic records 50 to create executable object code 92 that forms the help system. The code generator 42 creates and outputs executable object code 92 and preferably stores it as a file. The executable object code 92 is also returned to the authoring system 20 and can be operated along with debugging to test whether the executable object code 92 operates as desired.

As has been noted above, the present invention includes a plurality of methods for creating and testing a help system. The present invention preferably includes: methods for creating, deleting and editing a topic record; methods for creating, deleting and editing links between topic records; methods for inserting, editing and deleting objects within a topic record; and methods for creating, editing and deleting a table.

Figure 14:
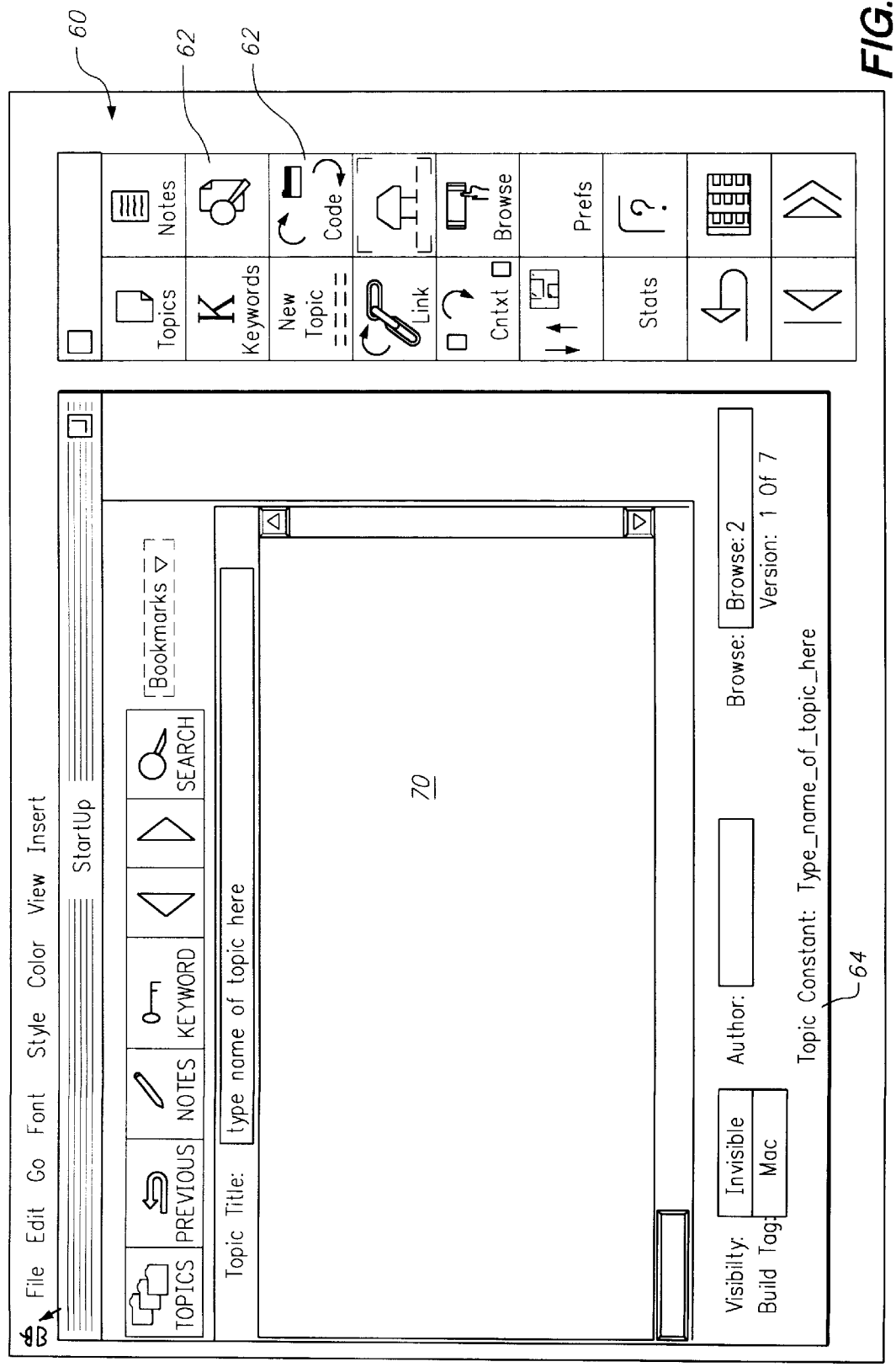
FIG. 14 is a graphical representation of the display device showing a topic record display interface and tool palette according to the present invention.

Referring now to FIG. 14, a graphical representation of the display device 22 during operation of the authoring system 20 of the present invention is shown. The authoring system 20 preferably displays a floating palette 60 with tools 62 to provide access to the above methods of the present invention. FIG. 14 also illustrates the user interface or entry dialog box 64 for presenting the data stored in topic records 50 for review by the user 90. The graphical interface is preferably created using the application program entitled HyperCard. Those skilled in the art will realize that the user interface 64, tools 62 and floating palette 60 could also be implemented through direct programming.

Figure 5:
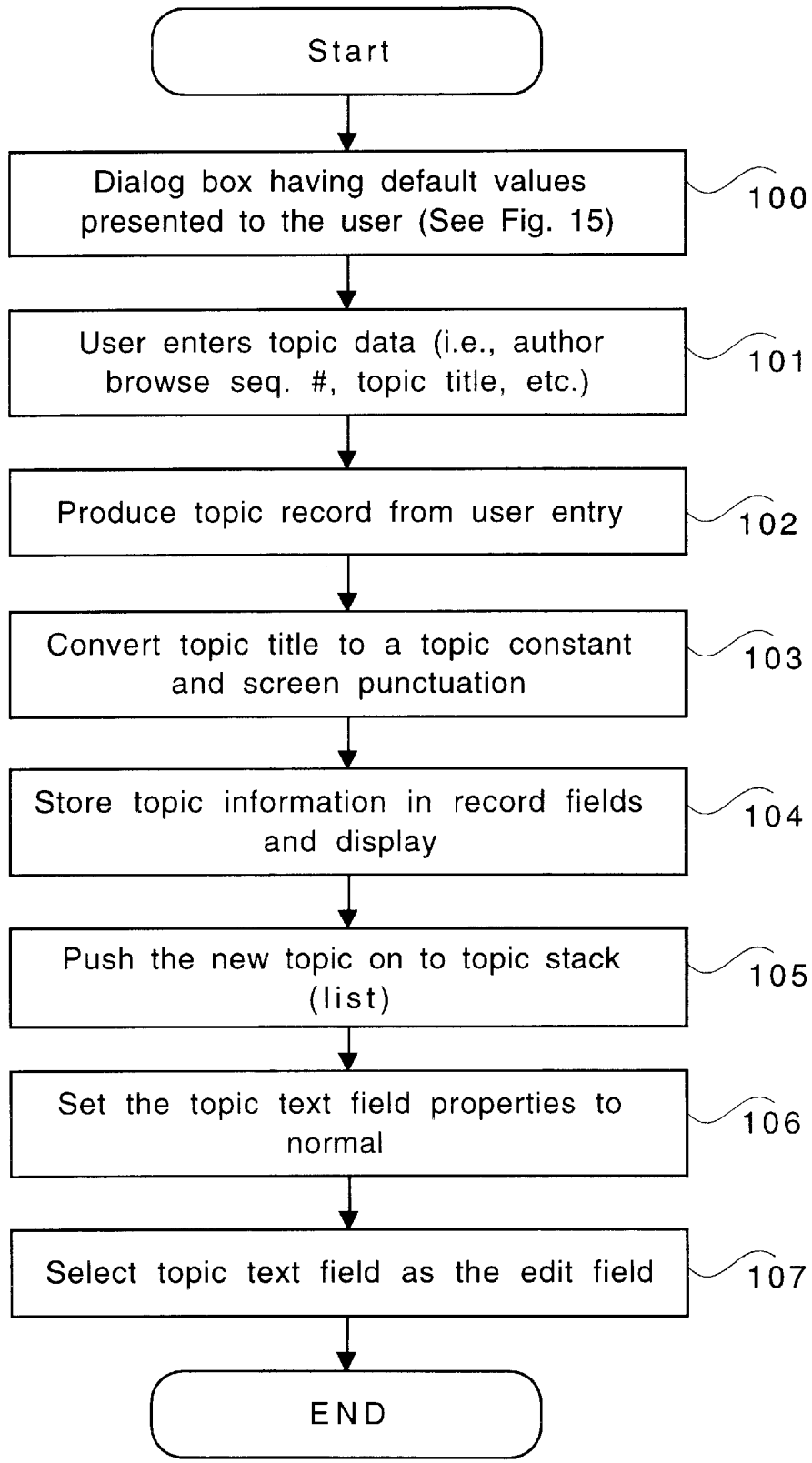
FIG. 5 is a flowchart of the preferred method for creating a topic according to the present invention.
Figure 15:
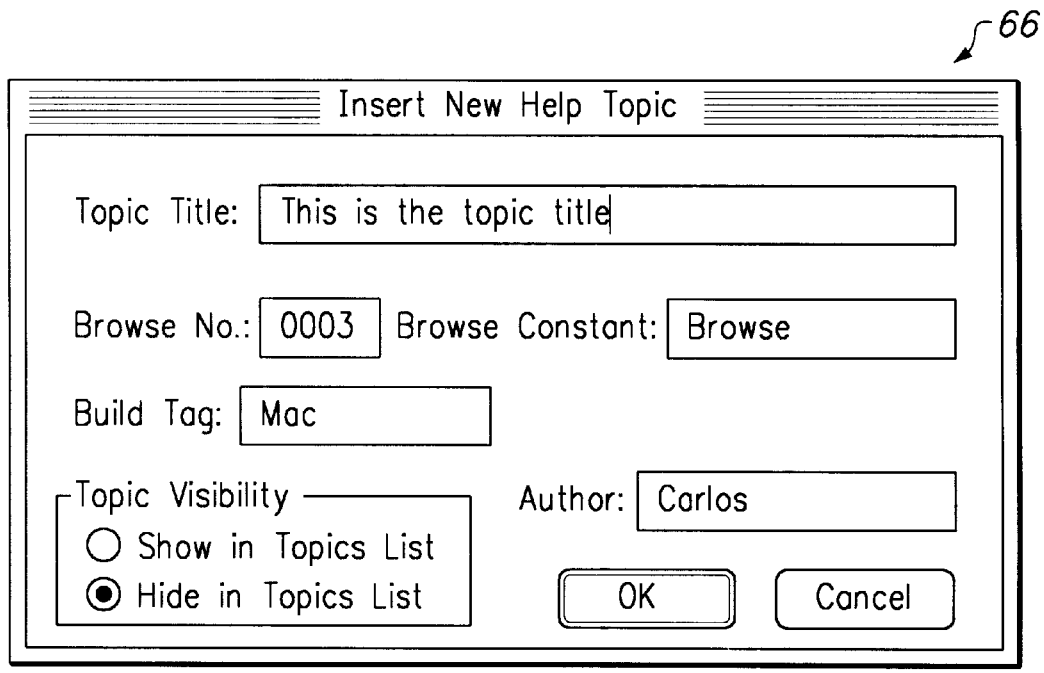
FIG. 15 is a graphical representation of the display device showing a topic editing dialog box according to the present invention.

Referring now to FIG. 5, the preferred method for creating a topic record 50 will be described. The preferred method begins in step 100 by presenting to the user 90 a draggable modal dialog box 66 having default values. Depending on the default values set upon initialization, the values in some of the fields, such as author and build tag, will be automatically set to the default value by the authoring system 20. An exemplary dialog box 66 is shown in FIG. 15. For example, the value in the build tag field might remain the same as new topic records 50 are created, while the value in the browse no. field would be incremented for each new record created. Next, the user 90 enters topic data in step 101. At this stage, the user 90 is able to input the data in the topic title, the build tag or any of the fields displayed as shown in FIG. 15. Then, the authoring system 20 creates a new topic record 50 in step 102. In step 103, the authoring system 20 converts the topic title to a topic constant. This topic constant is used to identify the topic record 50 and is also used in a topic list displayed to the user 90. As part of the conversion process, the authoring system 20 screens out symbols and punctuation that are illegal as inputs to the code generator 42. Then in step 104, the data input in step 101 is stored in the topic record 50 with each piece of data being stored in a corresponding field of the topic record 50. Next in step 105, the new topic record 50 is stored in the topic stack. This list is preferably maintained as a stack or Last-In-First-Out queue. Then in step 106, the field properties of topic text field are set to normal so that when the user 90 inputs information, the style of the input data will default to normal. Finally in step 107, the method completes by selecting the topic text field 70 as the edit field and by positioning the cursor in the topic text field 70. The topic records 50 are preferably implemented in HyperCard, and step 107 is performed by making the topic text field a text edit field. In other words, once the cursor is moved outside the topic text field by the user 90, the data shown on the display device 22 in the topic text field will be stored in that field of the topic record 50 in memory.

Figure 6:
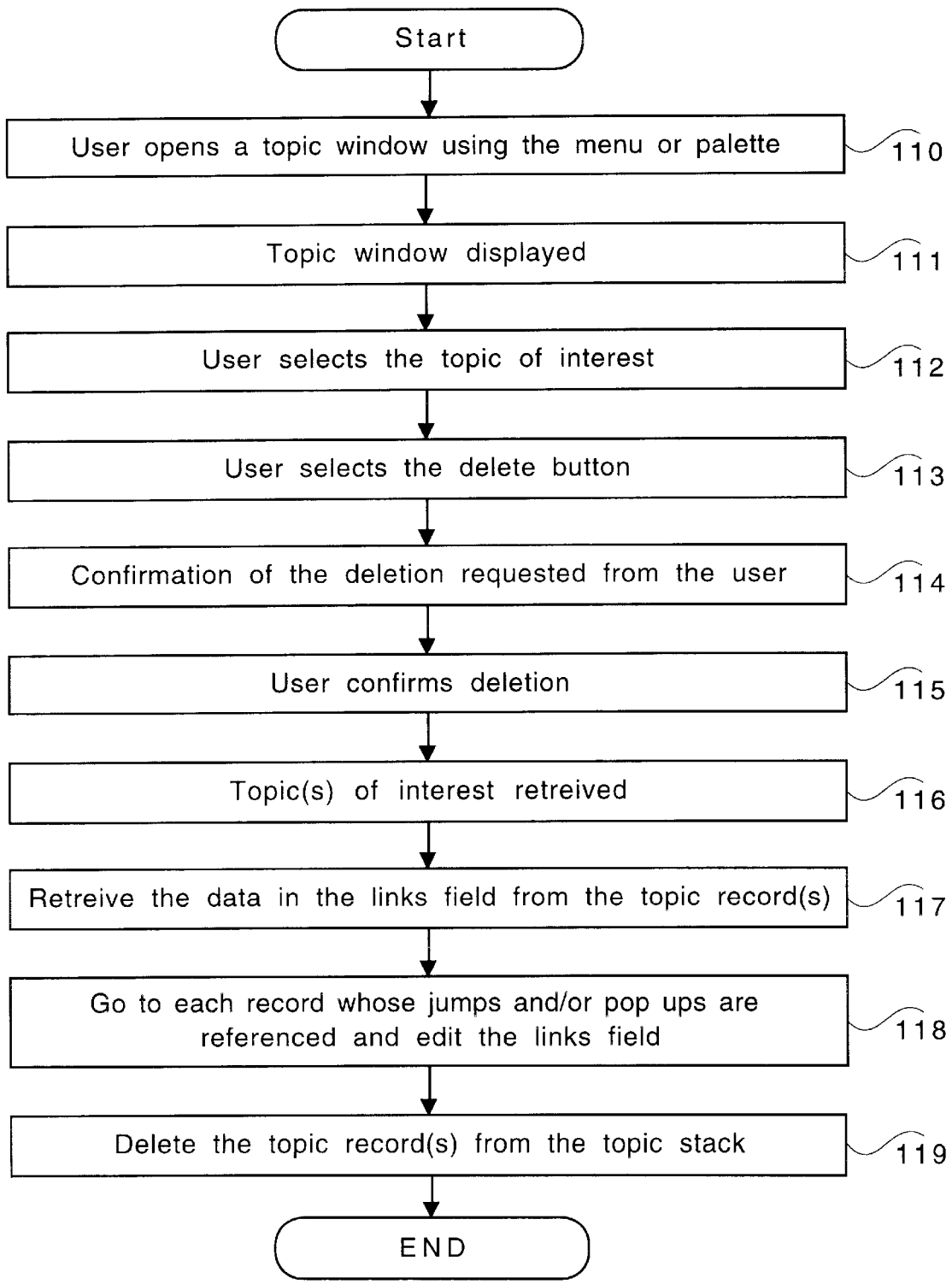
FIG. 6 is a flow chart of a preferred method for deleting a topic according to the present invention.
Figure 16:
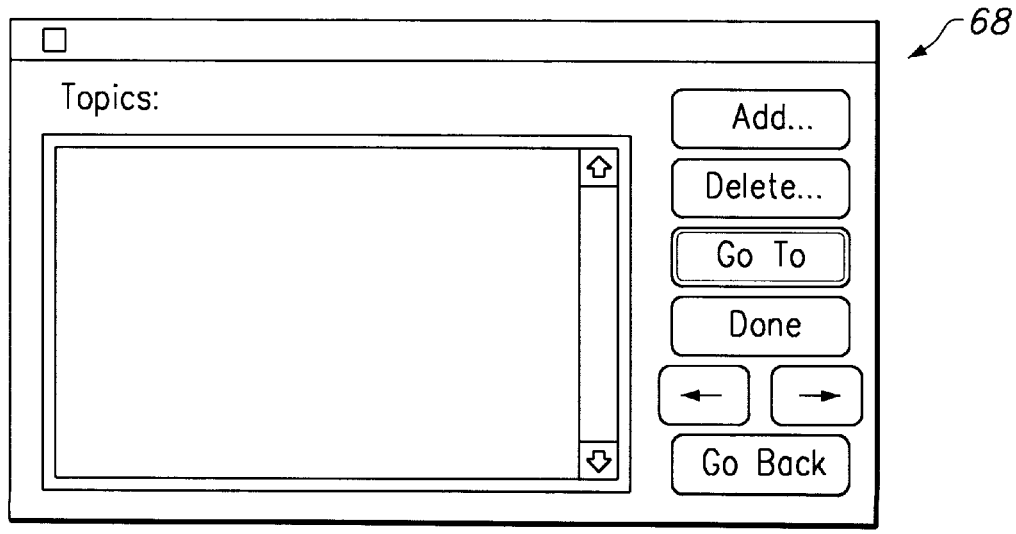
FIG. 16 is a graphical representation of the display device showing a topic list according to the present invention.

Referring now to FIG. 6, the preferred method for deleting topic records 50 will be described. The preferred method for deleting topic records 50 begins in step 110 when the user 90 opens a topic window using the menu or palette. An exemplary topic window 68, as shown in FIG. 16, is then displayed on the display device 22 in step 111. The topic records 50 in the authoring system 20 are preferably displayed in alphabetical order according to their topic constant. Depending on the size of the window on the display device 22, the number of topics displayed may vary. Next, the user 90 uses the input device 32 to select a topic of interest in step 112, and to select the delete button in step 113. This is preferably done with a mouse type controller by clicking when the cursor is over the topic of interest as displayed in window 68, and then positioning the cursor over the delete button and clicking. In step 114, a confirmation message is displayed on the display device 22 requesting that the user 90 confirm the deletion. The user 90 confirms that the deletion is accurate or discontinues the process of deleting a topic record in step 115. If the user 90 confirms the deletion, the method continues in step 116, where the topic record corresponding to the topic record selected in step 112 is retrieved. Next, the authoring system 20 retrieves the data in the links field of the topic record 50. The links field identifies any other records that have been linked to the topic record about to be deleted. Each record identified in step 117 is then retrieved in step 118, and the links field of each record is edited to remove the reference to the record that will be deleted. The affected records are then saved. This occurs automatically to the user 90 and therefore eliminates any need for the user 90 to track which records are in existence for jumps and pop up windows. Finally, in step 119, the topic record selected in step 112 is deleted, and the method is complete.

Figure 7:
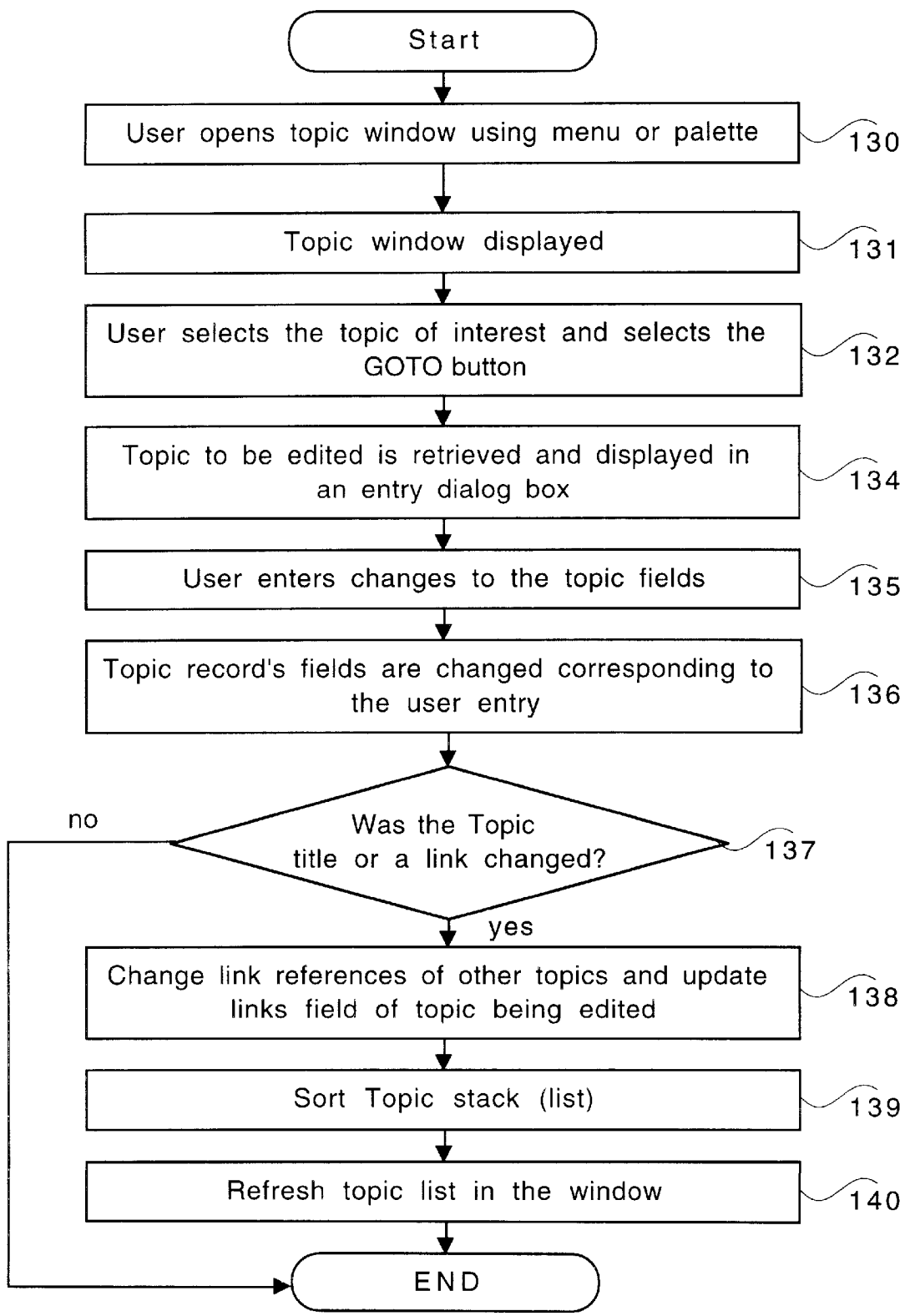
FIG. 7 is a flow chart of a preferred method for editing a topic according to the present invention.

Referring now to FIG. 7, the preferred method for editing a topic record 50 is described. The preferred method for editing a topic record 50 begins with steps similar to the method for deleting records. The user 90 opens a topic window using the menu or palette in step 130, and then the topic window 68 is displayed in step 131. In step 132, the user 90 provides further input by selecting a topic of interest that is displayed in the topic window 68 and selecting the GOTO button. The selected topic record is then retrieved in step 134, and data from the selected topic record is displayed in an entry dialog box 64 (See FIG. 14). Then the user 90 can input changes to any portion of the topic record in step 135. This is preferably done using the entry dialog box 64 in a WYSIWYG manner using the HyperCard application program. In step 136, the fields of the topic record retrieved are then updated using input from step 135. However, if a link is changed, it is not updated in step 136. The link changes are temporarily stored in memory, and this update is made later in this method as described below. Then in step 137, the method tests whether the topic title or a link has changed because of inputs from the user 90. If neither the topic title nor any link has been changed, then the method for editing is complete and ends. However, if either the topic title or any link has been edited, the method continues in step 138. Any change in the topic title or change to a link is significant because such changes will affect the accuracy of data stored in other topic records. Therefore, in step 138, the method retrieves any topic records that are linked to the topic record that is being edited. The retrieved topic records are individually modified to reflect the change in the title of the record being edited for an accurate reference or modified to reflect the change in links. Then the link data input by the user 90 is stored in the links field of the topic record. Next in step 139, the topic stack or list is sorted in alphabetical order by topic title. This step is performed in case the topic title has changed and to maintain the alphabetical ordering. Those skilled in the art will realize that a variety of other types of ordering could also be maintained. Finally, in step 140, the screen of the display device is refreshed to reflect reordering of the topic record, if any.

Figure 8:
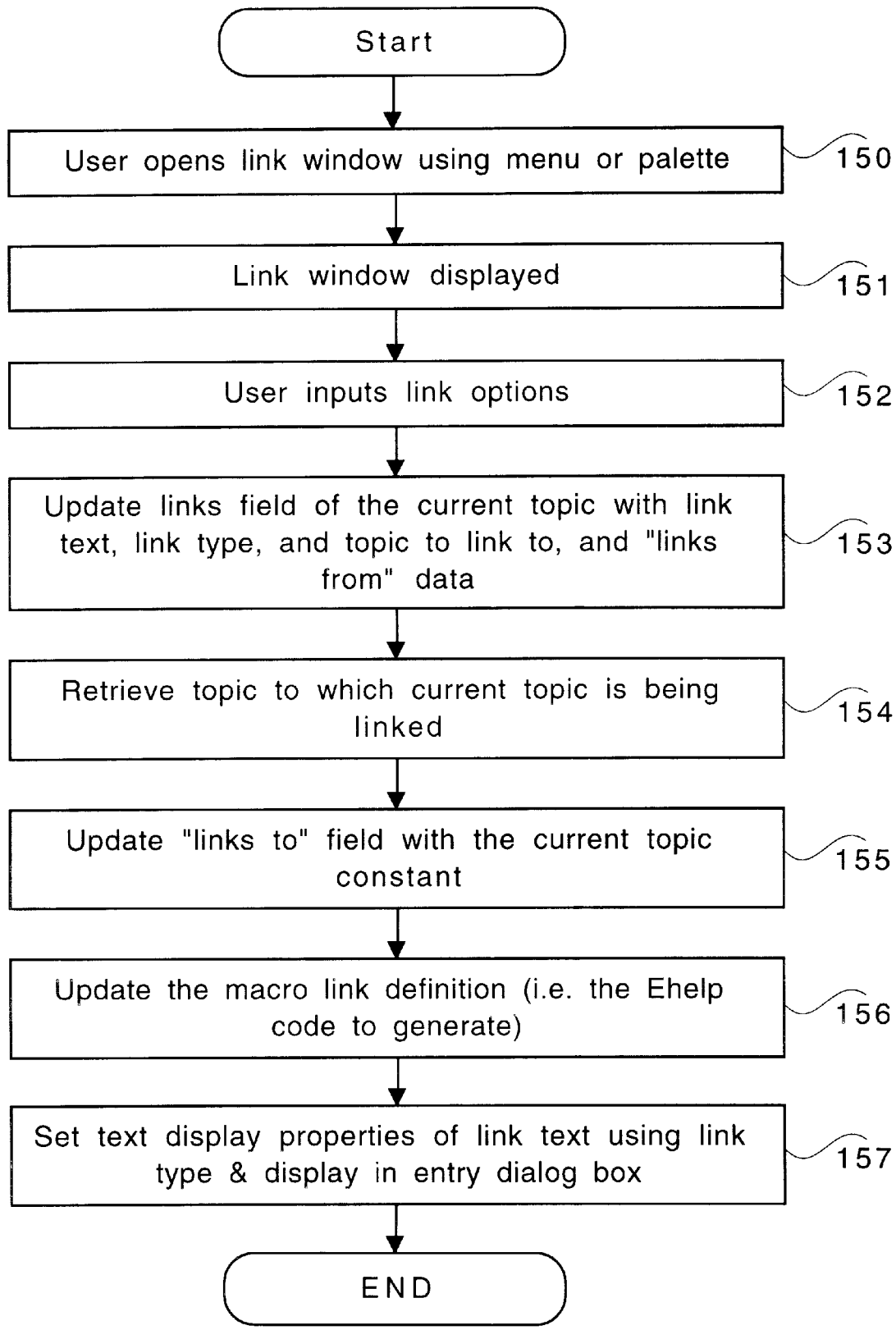
FIG. 8 is a flow chart of a preferred method for creating links between topics according to the present invention.
Figure 9:
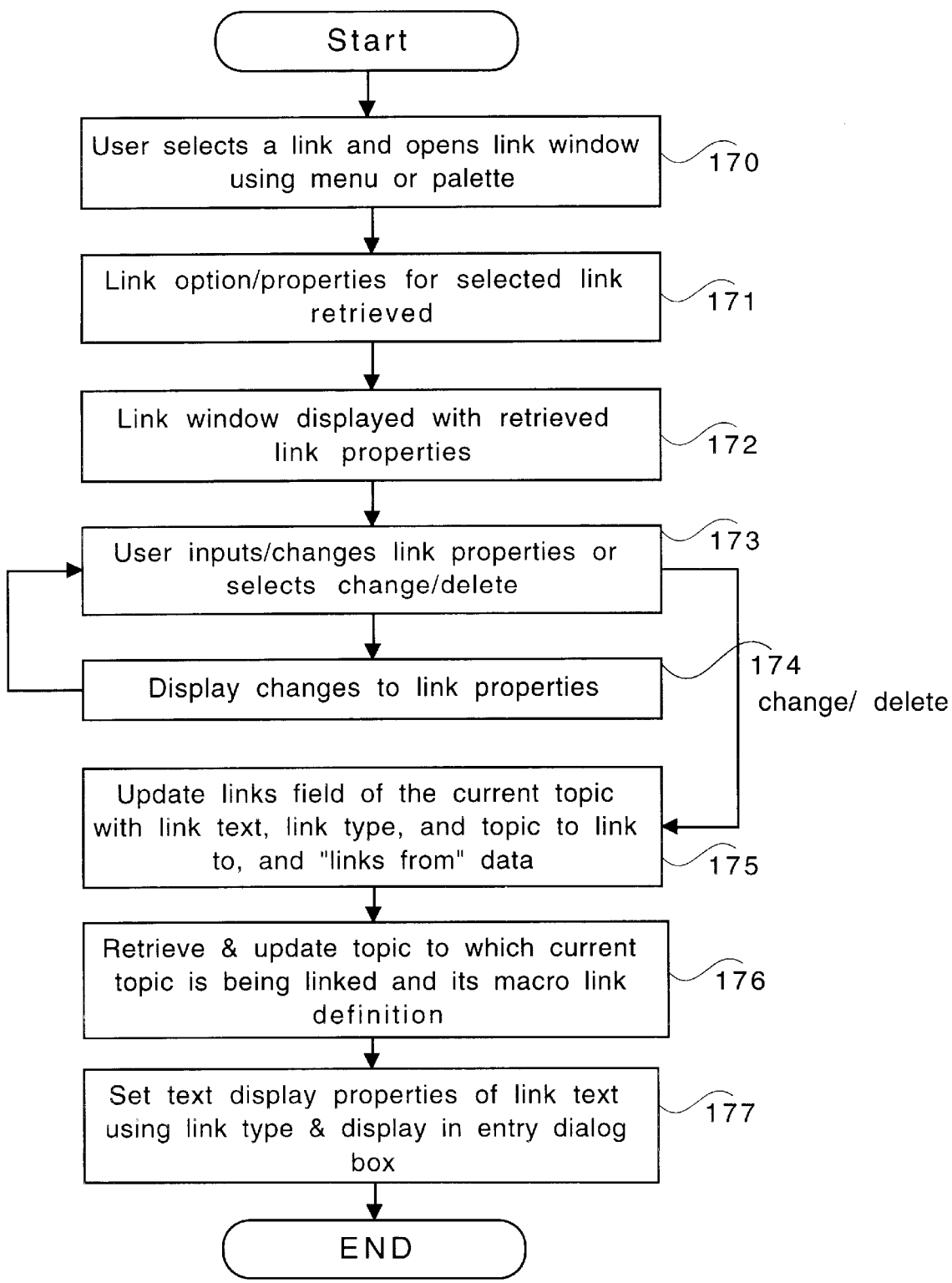
FIG. 9 is a flow chart of a preferred method for editing or deleting links between topics according to the present invention.
Figure 17:
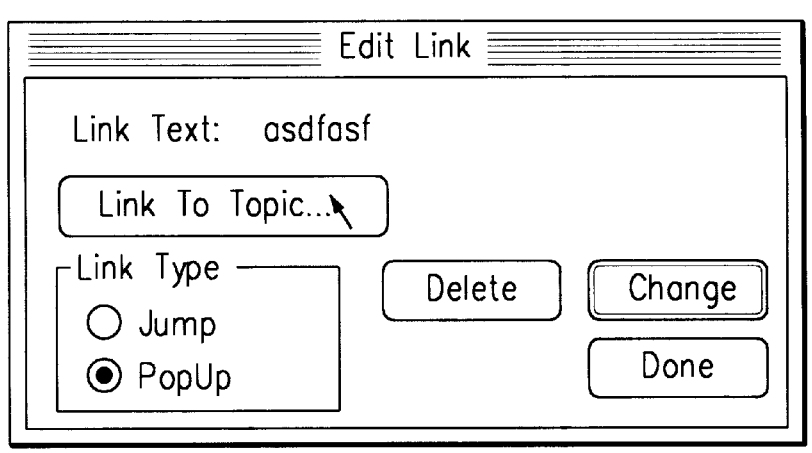
FIG. 17 is a graphical representation of the display device showing a dialog box for creating links between topics according to the present invention.

Referring now to FIGS. 8 and 9, the preferred method for editing links will be described in more detail. A particular advantage of the authoring system 20 of the present invention is its ability to automatically manage and provide for links between topic records 50. Referring now to FIG. 8 specifically, the preferred method for creating links between topic records 50 will be described. The method begins in step 150 with the user 90 opening a link window 72 using a menu or palette 60. Alternatively, the user 90 may select a portion of text or a graphic image, and then open the link window 72. In the alternate case, the text or graphic image over which the link window is opened becomes the link text. Then in step 151, the link window 72 is displayed on the display device 22. An exemplary link window 72 is shown in FIG. 17. The link window 72 preferably displays the link options such as link text, the topic record 50 to which the text is linked, and the link type (jump or pop up). Then in step 152, the user 90 inputs the link options to establish a link between text or a graphic image in a topic record and other topic records. Next in step 153, the preferred method updates the links field of the current topic with link text, link type, and topic to link to, and "links from" data that the user 90 input in step 152. For example, if the authoring system 20 is displaying topic record A, and the user 90 opens the link window 72 and inputs link data for a link to topic record B, then the link options will be stored in the link field of topic record A in step 153. Next, in step 154, the authoring system 20 retrieves the topic record to which the current topic is being linked. In the example, topic record B would then be retrieved by execution of step 154. Then in step 155, the links field of the topic record retrieved in step 154 is updated with the topic constant of the current record. Continuing with the example, the links field, in particular a portion noted as the "links from" of topic record B would be updated with the record ID or the string constant for topic record A. Then in step 156, the macro link definition of the topic record retrieved in step 154 is updated to provide a pop up or link type connection between the two records. The macro link definition provides a series of commands used by the code generator to create links in the resulting object code that will eventually form the help system. Finally in step 157, the text display properties of link text in the current record are set according to the link type. For example, the jump type link is displayed with an underline and group styling when the text of the topic record is displayed while a pop up type link is shown with group styling when the text of the topic record is displayed. This is particularly advantageous because use of the different styles allows the user 90 to quickly identify the presence of a link and its type by viewing the text of the topic record in an entry dialog box. Once the text properties have been set, the updated current record is displayed in the entry dialog box.

Referring now to FIG. 9, the preferred method for editing or deleting links between topic records will be described. The preferred method begins in step 170 with the user 90 selecting a link and opening the link window 72 using a menu or palette. The user 90 can select the link by highlighting the link text displayed in the entry dialog box 72. In step 171, the link option or properties for the selected link are retrieved from the link field of the current record. In step 172, the link window 72 is displayed on the display device 22. Included within step 172 is the insertion of the retrieved link options into the fields of the link window 72 and the display of the link options to the user 90. Next in step 173, the user 90 inputs any desired changes to the link options. If link options are modified, then the method continues in step 174, where the input link options are displayed in the entry dialog box 72 and temporarily saved in memory 26. After step 174, the method returns to step 173 to accept additional link option inputs. If in step 173, the user 90 inputs a delete or change command, then the method continues in step 175 where the links field is updated to reflect changes to the link option or the deletion of the existing link. Next in steps 176 and 177, the method updates topics to which current topic is being linked, and resets the display to reflect changes to the link. Step 175, 176, and 177 are preferably the same as step 153–157 of the method for creating links described above. Once the display has been updated, the method ends.

Figure 10:
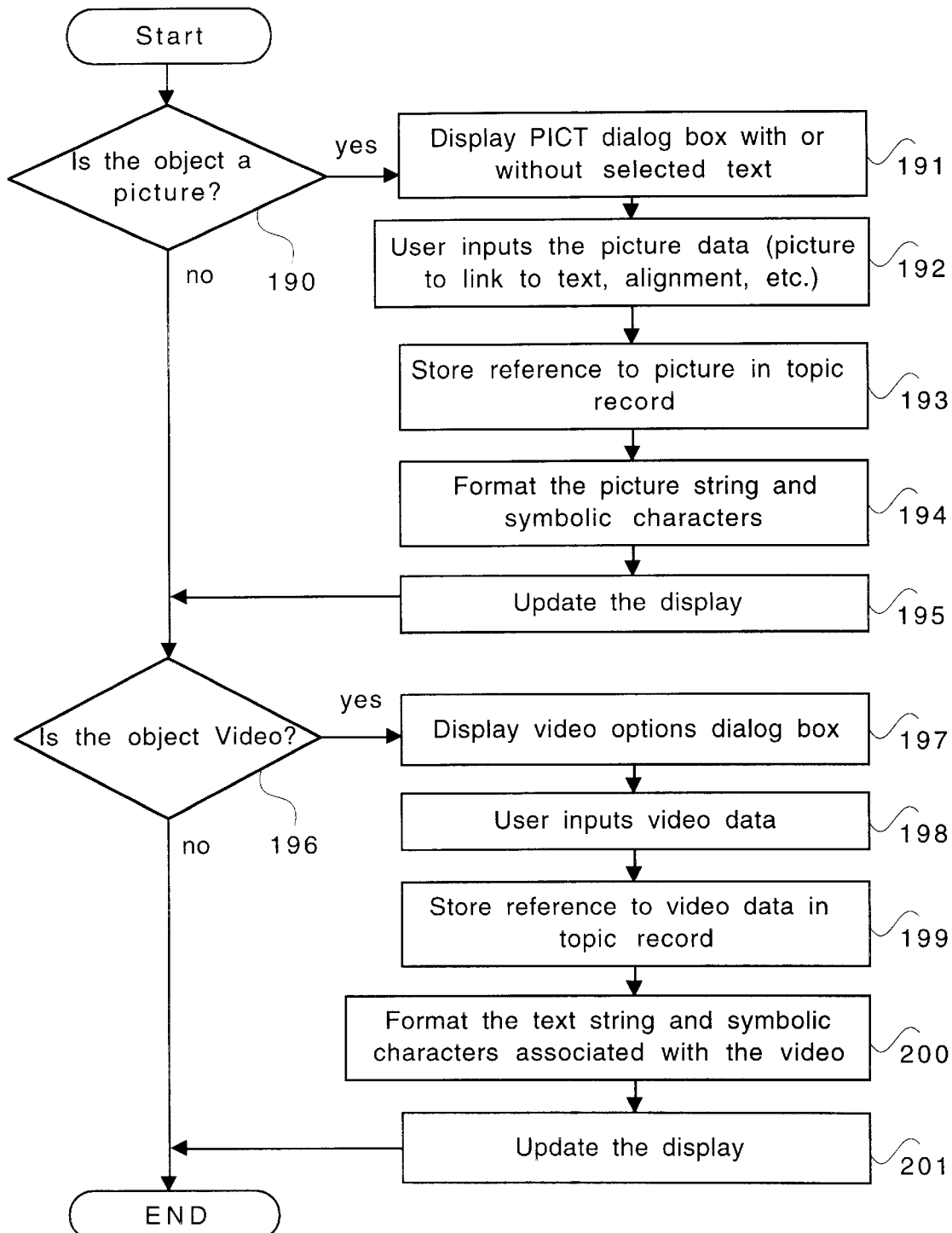
FIG. 10 is a flow chart of a preferred method for inserting objects within a topic according to the present invention.
Figure 18:
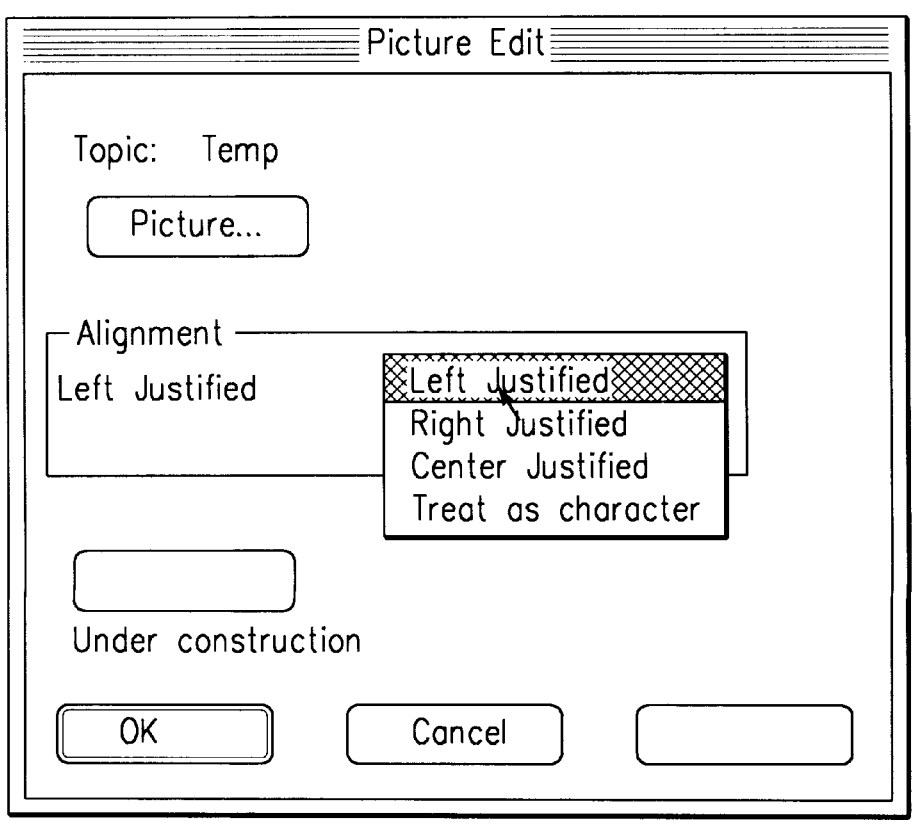
FIG. 18 is a graphical representation of the display device showing a dialog box for including a picture with a topic according to the present invention.

As has been noted above, the authoring system 20 advantageously provides the user 90 with the capability of inserting graphics, pict files, sound and video into a topic record. Referring now to FIG. 10, the preferred method for inserting objects into topic records or editing existing records will be described. The method begins in step 190 by determining whether the object is a picture or a pict file. If the object is determined to be a picture, the method continues in step 191. Otherwise, the method continues to step 196. In step 191, the method displays a picture dialog box 74. An exemplary embodiment for the picture dialog box 74 is shown in FIG. 18. In FIG. 18, the graphical interface shows a mouse cursor where the user 90 is in the process of selecting the position for the picture. Then in step 192, the user 90 inputs the picture options such as the text to which the picture is to be linked, the name of the file storing the pictures, the positioning of the picture, and other attributes of the picture that the user 90 may want to specify. Those skilled in the art will realize that a variety of additional options for pictures may be provided. Then in step 193, the authoring system 20 stores a reference to the object in the picture field of the current topic record. Then in step 194, the method formats the text in the topic record associated with the picture. In particular, the text string is formatted to be displayed in a visually distinct manner such as with an underline or in bold. The method also adds a special character or symbol at the beginning of the string to indicate that there is a picture associated with the text. In an exemplary embodiment, an apple character is used although those skilled in the art will realize that a variety of other symbols could be used. Next in step 195, the display is updated to reflect the changes to the text string that were made in step 194. Then the method continues in step 196.

As noted above, step 196 may also be directly reached from step 190 in the event that the object is determined not to be a picture. In step 196, the authoring system 20 tests whether the object to be inserted into the topic record is a video object. This can be done in a variety of conventional ways such as comparing the file format for the object. If the object is not determined to be a video object the method is complete and ends. If the object is determined to be a video object the method continues in step 197. In step 197, the method displays a video options dialog box. The video options dialog box is similar to that shown in FIG. 18, but provides fields and labels that allow the user 90 to input the display characteristics and associated text for a segment or clip of video. Next in step 198, the user 90 inputs options for the video object. In step 199, the authoring system 20 stores a reference to the video object in the video field of the current topic record. Then in step 200, the method formats the text in the topic record associated with the video object. In particular, the text string is formatted to be displayed in a visually distinct manner different from link and picture objects. The method also adds a special identifying character or symbol at the beginning of the string to indicate that there is a video object associated with the text. Next in step 201, the display is updated to reflect the changes to the text string that were made in step 200. Then the method is complete and ends. Those skilled in the art will realize that the above methods for testing objects, updating the topic record and updating the display may also be employed for other objects such as sound bites, links or other objects that may be desirable for use in a help system.

Figure 11:
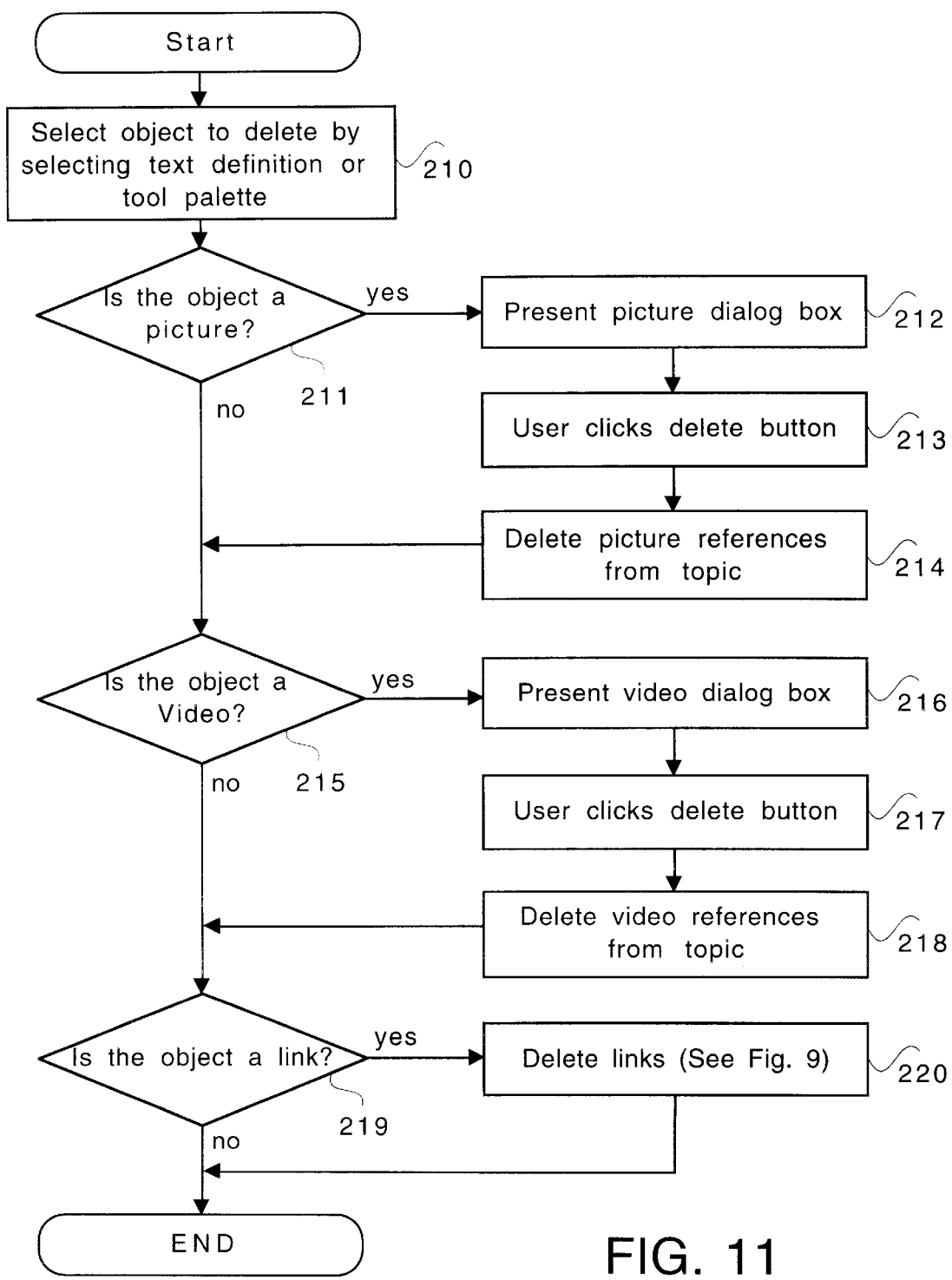
FIG. 11 is a flow chart of a preferred method for deleting objects from topics according to the present invention.

Referring now to FIG. 11, a preferred method for deleting objects from topic records is shown. The method for deleting objects from topic records begins in step 210 with the user 90 selecting an object to delete. This selection can be done by a series of keystrokes such as the option key in combination with the return key while the cursor is positioned over text associated with an object. In a similar manner, the present invention allows the user 90 to select an object for editing. The user 90 may also use a tool palate or menu and select a definition for deleting. Once an object has been selected, the method continues in step 211 by determining whether the object is a picture. If the object is a picture, the method then displays the picture dialog box 74 in step 212. Then in step 213 the user 90 confirms the deletion by selecting the delete button displayed and operating with the input device 32 in a conventional manner. Next in step 214, the references in the topic record to the picture are removed. Then the method continues in step 215. Step 215 may also be reached directly from step 211 if it was determined that the object is not a picture. In step 215, the method tests whether the object to be deleted is a video object. If the object is a video object, the method proceeds to step 216 where a video dialog box is displayed on the display device 22. Then in step 217 the user 90 confirms the deletion by selecting the delete button displayed and operating with the input device 32 in a conventional manner. Next in step 218, the references in the topic record to the video object are removed.

Next the method moves to step 219 either from step 218 or directly from step 215. In step 219, the method tests whether the object is a link. If the object is a link, the links are deleted in step 220 as has been described above with reference to FIG. 9. Then the method is complete. If the object was not determined to be a link in step 219, then the method ends. Those skilled in the art are aware that this method may be adjusted like the method for creating and editing objects to handle other types of objects such as sound.

Figure 12:
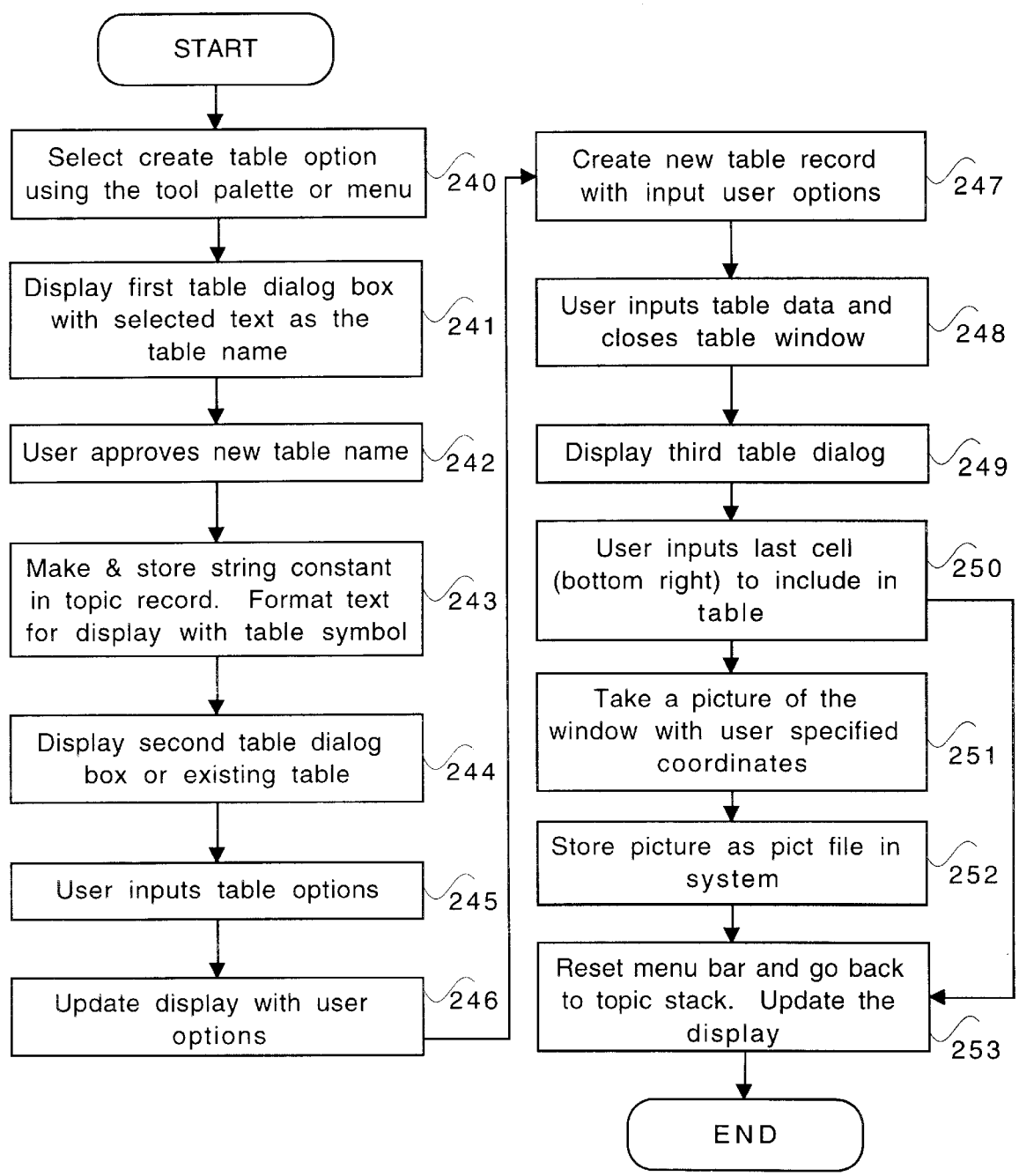
FIG. 12 is a flow chart of a preferred method for creating a table according to the present invention.
Figure 19:
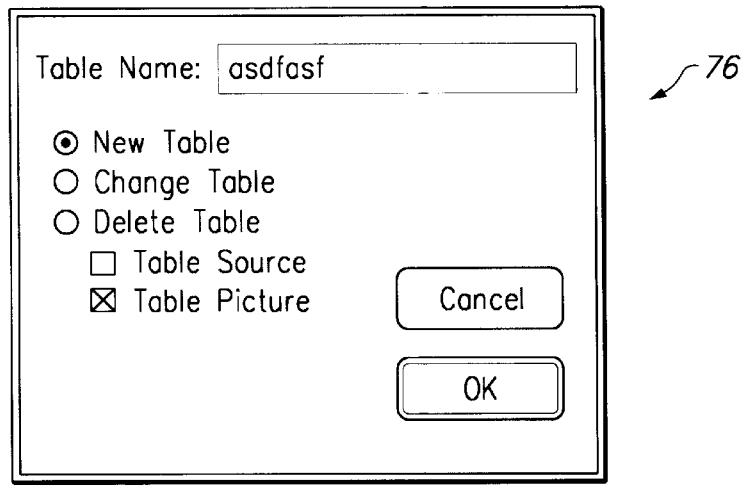
FIG. 19 is a graphical representation of the display device showing a first table dialog box for creating, editing or deleting a new table according to the present invention.
Figure 20:
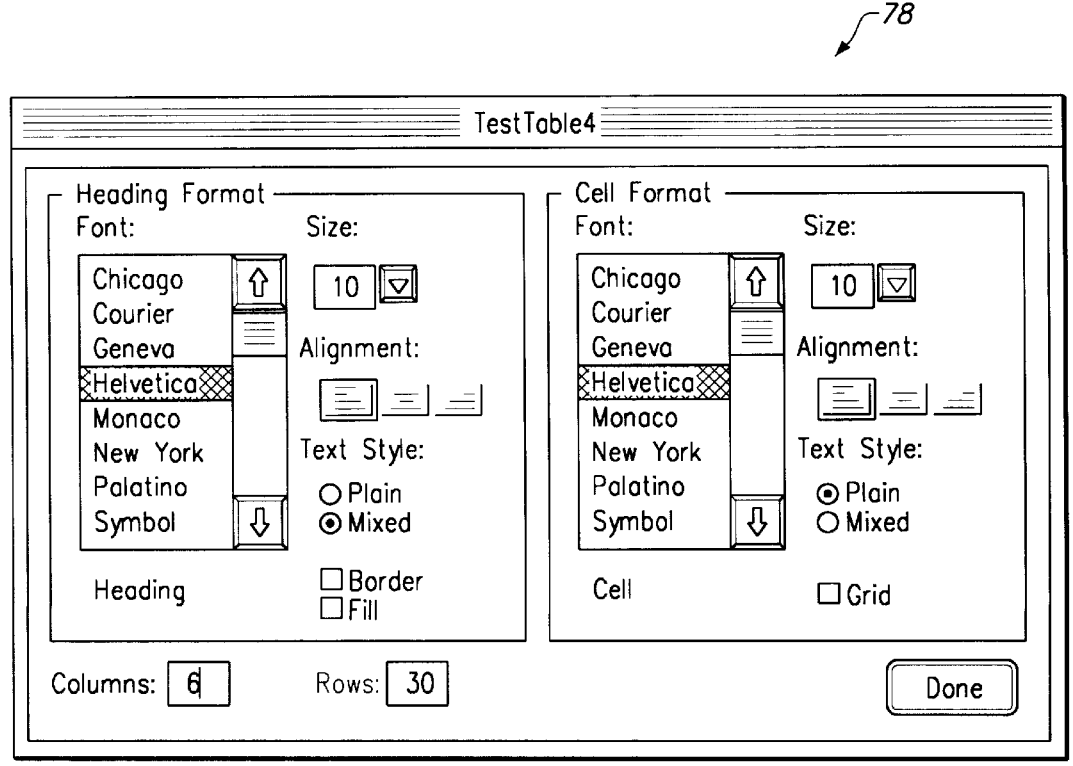
FIG. 20 is a graphical representation of the display device showing a second table dialog box for inputting the table options according to the present invention.

Referring now to FIG. 12, a flowchart of the preferred method for creating a table is shown. The preferred method begins in step 240 with the user 90 activating the table creation method from the tool palate or menu. After the user 90 has activated the table creation method, a first table dialog box 76 is displayed in step 241. The selected text, if any, is used as the table name and displayed in the first table dialog box 76. An exemplary embodiment of the first table dialog box 76 is shown in FIG. 19. The first table dialog box 76 provides fields and values to indicate the table name, and whether a table should be created, deleted or changed. Next in step 242, the user 90 approves the table name and selects the option of creating a table. In step 243, the string constant or name for the table is stored in the table field of the current topic record. The text string corresponding to the table name is also reformatted and presented on the display device 22. Similar to other objects, the text associated with the table is displayed in a visually distinct manner with highlighting that identifies the text as corresponding to a table object. A special identifying symbol may also be added to further identify the string as related to a table object. Next in step 244, a second table dialog box 78 is presented to the user 90. An exemplary embodiment for the second table dialog box 78 is shown in FIG. 20. The second table dialog box 78 provides the user 90 with a mechanism to specify a variety of parameters of the table including the heading format, heading size, heading font, heading text, heading style, heading alignment, the number of rows, the number of columns, the cell format, cell size, cell font, cell text, cell style, and cell alignment. In the preferred embodiment, the second table dialog box 78 is not presented to the user 90 if a table for the string constant already exists in the authoring system 20. If a table for the string constant already exists, it is presented to the user 90 in step 244 instead of the second table dialog box 78. Next in step 245, the user 90 inputs table options. Then in step 246, the display device 22 is updated to reflect the changes to the table options input by the user 90 in step 245. In step 247, the authoring system 20 creates a new table record using the options input by the user 90. As has been noted above, in the preferred embodiment each authoring system 20 has a table stack for storing the tables utilized by the authoring system 20. If the table was found to already be in existence, the existing table record is simply popped from the record stack. In step 248, the user 90 inputs table data and then closes the table window after any data and changes have been input. As part of closing the window, the table record is stored. In step 249, a message is presented to the user 90 requesting a selection of whether the table is to be stored as a picture, and whether the headers for the row and columns should be included. Those skilled in the art will realize that this can be accomplished in a variety of ways such as multiple dialog boxes or independent messages requiring a response. Additionally in step 249, the method preferably displays a message proximate and moving with the mouse cursor. The message requests that the user 90 position the mouse cursor over the bottom and right-most cell that is to be included in the picture and click the mouse. Then in step 250, the user 90 positions the mouse cursor as desired and clicks the mouse or inputs a command not to save the table as a picture. If the user 90 decides not to store the table as a picture, the method jumps to step 253. Otherwise the method continues in step 251. In step 251, the authoring system 20 takes a picture of the window with the user 90 specified coordinates. In particular, the method preferably creates a pict file including the borders specified by the user 90, and the cells of the table specified by the user 90. Then in step 252, the picture is preferably stored as a pict file in the authoring system 20. The authoring system 20 preferably provides a single folder or directory for storing pictures used by the authoring system 20. Finally in step 253, the method resets the menu bar and returns to the topic stack. The display device 22 is also updated by returning to the entry dialog box 64.

Figure 13:
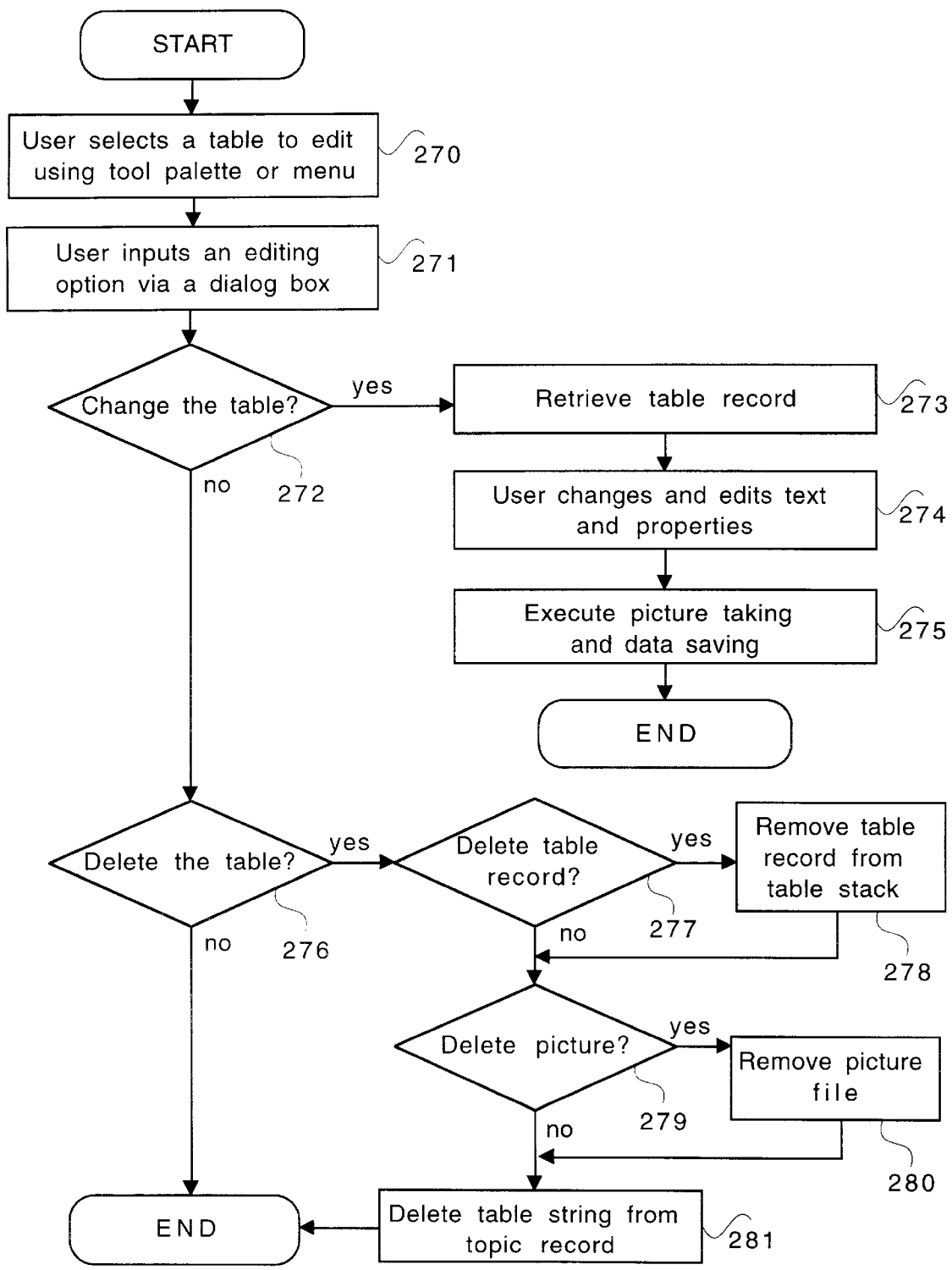
FIG. 13 is a flow chart of a preferred method for editing or deleting a table according to the present invention.
Figure 21:
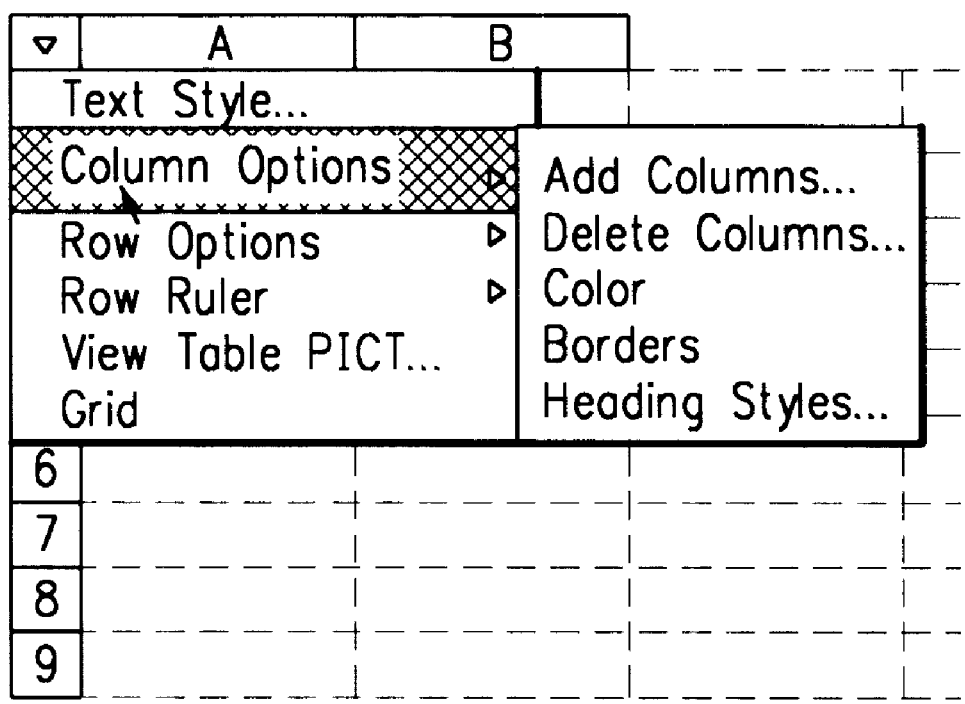
FIG. 21 is a graphical representation of the display device showing a table during the editing of the present invention.

Referring now to FIG. 13, the preferred method for editing and deleting tables will be described. The method begins in step 270 with the user 90 selecting a table to edit or delete using a menu or tool palette. Next in step 271, the first table dialog box 76 is presented to the user 90, and the user 90 inputs editing options. The user 90 has the option of changing a table or deleting a table. If the user is deleting a table, the user can also specify whether the table source (the underlying table record) and/or table picture (the picture file) should also be deleted. In some instances a table may be referenced by two different topic records 50; therefore, the deletion of the source table record does not occur automatically. Next in step 272, the method tests whether the user 90 selected to change the table. If the user has selected to change the table, the method continues with step 273. In step 273, the table record for the table selected in step 270 is retrieved. Then in step 274, the table is presented on the display device 22 so that the user 90 can input changes and edit the table. As shown in FIG. 21, when the table is displayed, the user may edit the table options using a selectable button positioned near the origin of the table. Activation of the selectable button allows the user 90 to change a variety of parameters defining the table. Then in step 275, the system performs picture taking and data saving of the table record as has been discussed above with reference to steps 248–253 of FIG. 12. The method is then complete and ends.

If the authoring system 20 determines in step 272 that the user 90 is not changing a table, then the method continues with step 276. In step 276, the method tests whether the table is to be deleted. If not the method is complete and ends. However, if a table is to be deleted, the method proceeds to step 277 to determine whether the text string defining the table should be deleted. Whether the table record corresponding to the selected table should be deleted is determined by the options input by the user 90 in step 271. If the user 90 has indicated that the table source should be deleted, the underlying table record will be deleted. If the table record is to be deleted, the method performs step 278 where the table record is removed from the table stack before performing step 279. If the table record is not to be deleted, the method proceeds directly to step 279 without performing step 278. In step 279, the method determines whether the picture is to be deleted. Whether the picture is to be deleted can be similarly determined from the user's input. If the picture is to be deleted, the picture file is removed from the system 20. Then the method continues to step 281. In step 281, the method then deletes the text string identifying the table record from the table field of the topic record and the method ends.

Figure 22A:
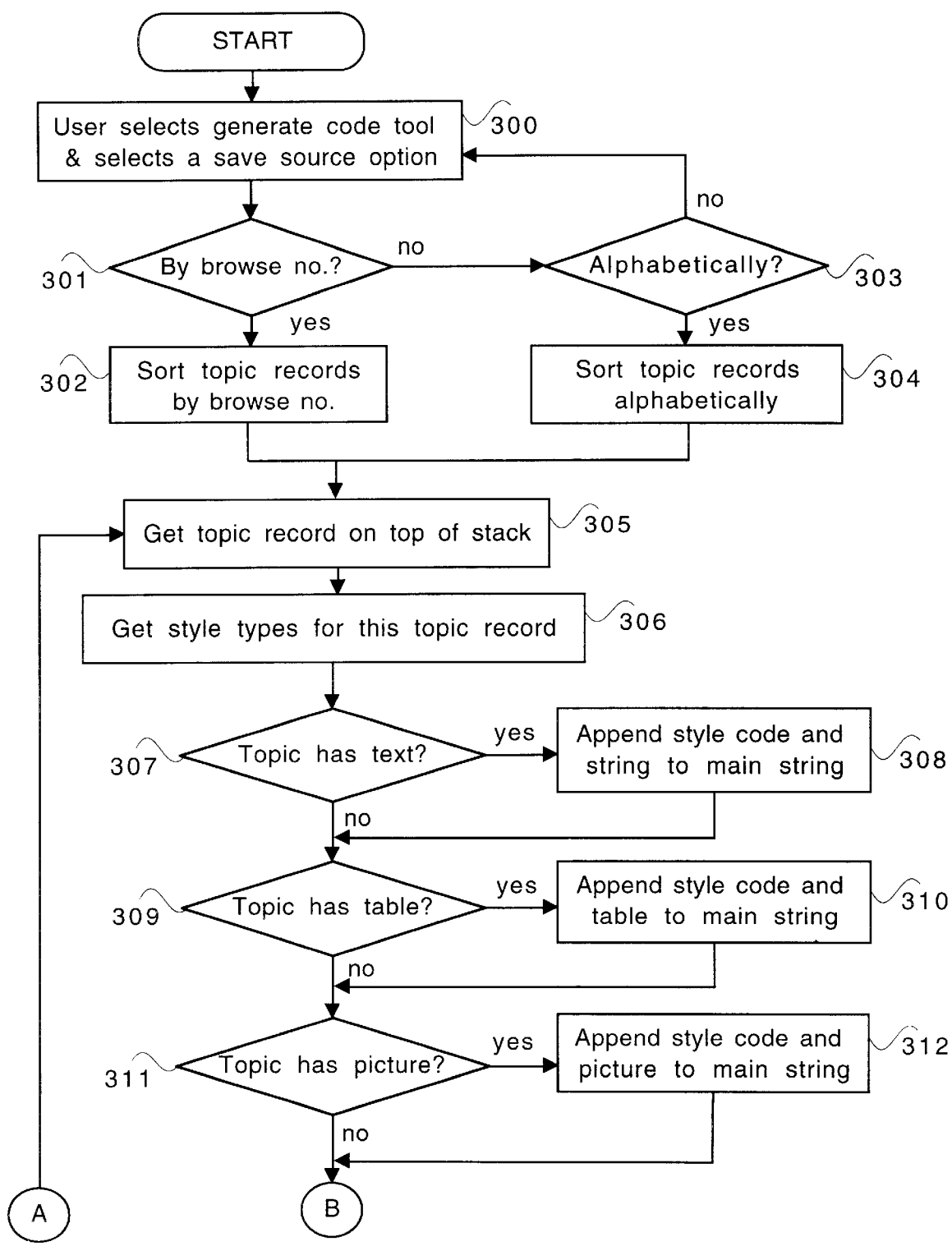
FIGS. 22A and 22B are a flow chart of a preferred method for transforming the topic records into input for the code generator according to the present invention.
Figure 22B:
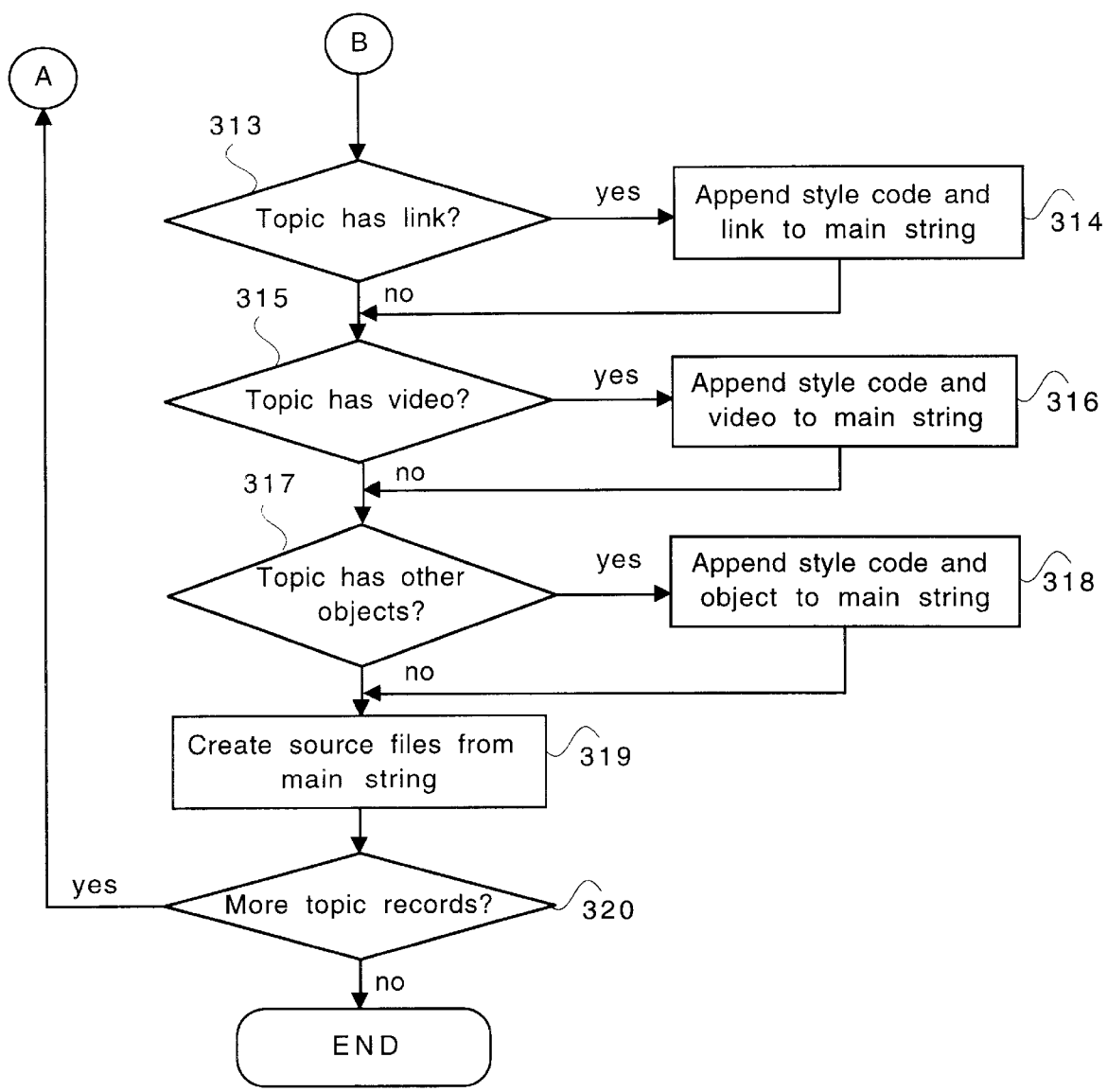

Referring now to FIGS. 22A and 22B, a preferred embodiment for transforming the data in the topic records 50 into coded data for input to the code generator 42 will be described. The preferred method begins in step 300 when the user 90 selects generate code tool or the option of generating object code for a help system from the menu. In the preferred embodiment, the user 90 may select one of two save source options for sorting the topic records 50 before the object code is generated. The user 90 can select to sort the topic records 50 alphabetically or by browse sequence number. This selection is also input by the user 90 in step 300. Next, the method tests whether the user 90 has chosen to sort the topic records 50 by browse sequence number in step 301. If the user 90 has chosen to sort the topic records 50 by browse sequence number, the method continues in step 302 by sorting the topic records 50 in order of increasing browse sequence number. Then the method continues to step 305. If the user 90 has not chosen to sort the records by browse sequence number, the method proceeds from step 301 to step 303. In step 303, the method determines whether the user 90 has chosen to sort the topic records 50 alphabetically. If the user 90 has chosen to sort the topic records 50 alphabetically, the method continues in step 304 where the topic records 50 are sorted alphabetically by topic title. Then the method then proceeds to step 305. Otherwise, if the user 90 has not chosen to sort the topic records 50 alphabetically, the method returns to step 300 until the user 90 selects a sort option.

In step 305, the method retrieves the topic record 50 on the top of the record stack. Next in step 306, the method retrieves the style types used by this topic record 50 from a field within the topic record 50. The style types have been described above and include special formatting that will be used in the help system to accentuate objects or styles applied to text by the user 90. Next in step 307, the method determines whether the current topic record 50, the topic record 50 retrieved in step 305, includes text. If the topic record 50 includes text, then the method appends a style code for the text and the text string to a main string. The style code is retrieved from the styles field and the text is retrieved from the topic text field for the topic record 50. After the string and its style code(s) have been appended to the main string, the method continues in step 309. If the topic record does not have any text the method proceeds directly from step 307 to 309.

In step 309, the method tests whether the current topic record 50 includes a table. If the current topic record 50 does not include a table, the method proceeds directly from step 309 to step 311. However, if the current topic record 50 does include a table, the method moves to step 310. In step 310, the method retrieves the styles from the styles type field for any tables referenced in the topic record 50. Pictures of the table identified in the tables field of the topic record 50 are also retrieved using the referenced tables record and the table stack. Then the retrieved styles code and the picture of the table are appended to the main string. Then the method proceeds to step 311.

In step 311, the method tests whether the current topic record 50 includes any pictures. If the current topic record 50 does not include any pictures, the method proceeds directly from step 311 to step 313 of FIG. 22B. However, if the current topic record 50 does include a picture, the method moves to step 312. In step 312; the method retrieves the styles for the picture from the styles type field. Any pictures identified in the picture field of the topic record 50 are also retrieved from memory 26. Then the retrieved styles code and the picture(s) are appended to the main string. Then the method proceeds to step 313.

As shown in steps 313 through 317, links, video objects and other types of objects are similarly handled by testing whether the current record 50 includes a link, video object or other objects (steps 313, 315 and 317); and then appending the appropriate style type from the style field and the link, video object or other type of object (steps 314, 316 and 318). Those skilled in the art will realize that this conversion method may be adapted for a variety of other types of objects.

After step 317 or step 318, the method continues in step 319. In step 319, the method creates source files from the main text string. In other words, the method inserts the syntax, commands and calls that are recognizable to the code generator 42. The syntax, commands and calls inserted into the main text string are those provided to by the code generator 42 to produce the tables, links or other interoperability and format that the user 90 intended when the topic records 50 were created. Those skilled in the art will recognize that the syntax, commands and calls inserted to produce code data for the code generator 42 will vary according to the type of code generator 42 being used. Finally, the method tests whether the topic stack has any more topic records 50. If there are additional topic records 50, the method returns to step 305 to retrieve and process the next topic record 50. Once all the topic records 50 have been processed, the method is complete and ends.

While the present invention has been described with reference to certain preferred embodiments, those skilled in the art will recognize that various modifications may be provided. For example, the topic records may also provide an area for storing video data, and there may be additional methods for editing, inserting, and deleting video images from the help system. These and other variations upon and modifications to the preferred embodiment are provided for by the present invention which is limited only by the following claims.

What is claimed is:

1. A computerized authoring system providing an interactive environment for generating a help system compatible with a plurality of different platforms, the authoring system comprising:

a display device for displaying information from the system, the display device having an input;

an input device having an output for inputting information to the system;

a memory having inputs and outputs for storing data, the memory including a set of topic records each including a build tag field for storing a value to identify corresponding compatible platforms in order to provide functionality to the plurality of different platforms, means for displaying the set of topic records, and means for generating, from the topic records, a help system which operates alongside but apart from an application program in response to selections by a user of the application program; and a processing unit for controlling the means for displaying and the means for generating, the processing unit coupled to the display device, the input device, and the memory.

2. The computerized authoring system of claim 1, wherein the means for generating a help system includes:

a code generator for producing object code with context sensitivity from predefined formatting characters and text strings, the code generator coupled to the memory and the processor; and means for transforming the topic records into the predefined formatting characters and text strings used by the code generator, the means for transforming having an input and an output, the input of the means for transforming coupled to the memory for receiving the data stored in the topic records and the output of the means for transforming coupled to the code generator.

3. The computerized authoring system of claim 1, wherein each of the topic records further includes a title, an identification number, a set of topic text, and a means for storing references to tables and links.

4. The computerized authoring system of claim 1, wherein each of the topic records are stored in the memory in a topic stack.

5. The computerized authoring system of claim 1, wherein the memory further comprises:

a set of table records having table data;

means for storing the set of table records, the means for storing the set of table records coupled to the processing unit; and means for displaying the table data, the means for displaying the table data coupled to the processing unit and the display device;

wherein at least one topic record includes a reference to a table record.

6. The computerized authoring system of claim 1, wherein the memory further comprises a means for forming a link between any two topic records stored in the memory.

7. The computerized authoring system of claim 6, wherein the means for forming a link between any two topic records is at least one field in each of the set of topic records that stores a topic record identification number.

8. The computerized authoring system of claim 1, wherein:

the memory further comprises graphic files including a topic window, a tool palette and menus; and the means for displaying topic records operates with the processor to produce the topic window, which contains the data within the topic record, on the display device for the user to interactively edit using the input device with the tool palette and menus.

9. The computerized authoring system of claim 1, further comprising a means for indexing the topic records, the means for indexing operating in conjunction with the means for displaying to present a list of topic records sorted using data in the topic records.

10. The computerized authoring system of claim 9, wherein the means for indexing the topic record operates with the topic records and the means for displaying to display on the display device the list of topic records and those topic records to which each of the topic records is linked.

11. A computer implemented method for generating a help system compatible with a plurality of different platforms, the method comprising the steps of:

creating a topic record;

accepting data for the help system from a user;

storing the data in the topic record;

identifying in the topic record platforms that are compatible with the data;

displaying the data that has been stored;

generating coded data, in response to the stored data; and responding to selections by the user of the application program by using a code generator and the coded data as input to the code generator to produce the help system, which operates alongside but apart from an application program and explains functions and features of the application program.

12. The computer implemented method of claim 11, wherein the topic record includes topic record fields, wherein the topic record fields include a topic title and a topic constant, wherein the step of creating a topic record comprises the steps of:

displaying information to the user requesting the data for the topic record fields;

producing a new topic record in response to the data input by the user;

converting the topic title to the topic constant;

storing the topic constant in the topic record; and storing the topic record in a topic stack.

13. The computer implemented method of claim 11, further comprising a step of deleting a topic record, wherein the step of deleting a topic record includes the sub-steps of:

accepting user input to display a set of topic titles corresponding to a set of topic records stored in a topic stack;

displaying a topic window;

retrieving the set of topic titles corresponding to the set of topic records;

displaying the set of topic titles corresponding to the set of topic records in the topic window;

accepting user selection of a first topic record from the set of topic records;

updating a set of links between the first topic record and other topic records from the set of topic records in the topic stack;

removing the first topic record from the topic stack; and updating the display to reflect the deletion of the first topic record.

14. The computer implemented method of claim 11, further comprising a step of editing a topic record, wherein the step of editing a topic record includes the sub-steps of:

selecting a topic record to be edited;

displaying the data contained in the topic record on a display device;

inputting changes to the data contained in the topic record;

storing the inputted changes in the topic record;

determining whether a link of the selected topic was changed;

determining whether a topic title of the selected topic was changed; and changing link references within other records in a topic stack if the topic title or link of the selected topic was changed.

15. The computer implemented method of claim 11, further comprising a step of creating a link between a first topic record and a second topic record, wherein the step of creating a link includes the sub-steps of:

selecting the first topic record;

displaying a link options window;

inputting options for the link between the first topic record and the second topic record;

storing the options in a first links field of the first topic record;

retrieving the second topic record;

updating a second links field of the second topic record; and generating code data for the link between the first topic record and the second topic record.

16. The computer implemented method of claim 11, further comprising a step of changing a link between a first topic record and a second topic record, wherein the step of changing a link includes the sub-steps of:

selecting the link between the first topic record and the second topic record;

displaying a link options window for the link;

inputting changes to options for the link between the first topic record and the second topic record;

displaying the options changes in the link options window;

storing the options in a first links field of the first topic record;

retrieving the second topic record;

updating a second links field of the second topic record; and generating code data for the link between the first topic record and the second topic record.

17. The computer implemented method of claim 11, further comprising a step of adding an object to a topic record, wherein the step of adding an object to a topic record includes the sub-steps of:

determining a type of object to be added;

determining a string associated with the object to be added;

displaying a dialog box with options corresponding to the type of object to be added;

storing a reference to the object in the topic record;

formatting the string associated with the object according to the type of the object; and updating a display of the string associated with the object with the formatting.

18. The computer implemented method of claim 11, further comprising the steps of:

inputting a table name, and table options;

creating a table record with the table name and the table options;

inputting data for the table;

specifying a last cell of the table; and storing the table record in a table stack.

19. A computer system for automatically generating a help system compatible with a plurality of different platforms, the computer system comprising:

means for creating a topic record;

means for accepting data for the help system from a user;

means for storing the data in the topic record;

means for identifying in the topic record the platforms that are compatible with the data;

means for displaying the data that has been stored;

means for generating coded data, in response to the stored data; and means for responding to selections by the user of the application program by using a code generator and the coded data as input to the code generator to produce the help system, which operates alongside but apart from an application program and explains functions and features of the application program.

20. The computer system of claim 19, wherein the topic record includes topic record fields, wherein the topic record fields include a topic title and a topic constant, wherein the means for creating a topic record comprises:

means for displaying information to the user requesting the data for the topic record fields;

means for producing a new topic record in response to and including the data input by the user;

means for converting the topic title to the topic constant;

means for storing the topic constant in the topic record; and means for storing the topic record in a topic stack.

21. A computer useable medium having computer readable program code embodied therein for causing a computer to generate a help system compatible with a plurality of different platforms by performing steps comprising:

creating a topic record;

accepting data for the help system from a user;

storing the data in the topic record;

identifying in the topic record platforms that are compatible with the data;

displaying the data that has been stored;

generating coded data, in response to the stored data; and responding to selections by the user of the application program by using a code generator and the coded data as input to the code generator to produce help system, which operates alongside but apart from an application program and explains functions and features of the application program.

22. The computer useable medium of claim 21, wherein the topic record includes topic record fields, wherein the topic record fields include a topic title and a topic constant, and wherein the program code for performing the step of creating a topic record further comprises program code for:

displaying information to the user requesting the data for the topic record fields;

producing a new topic record in response to and including the data input by the user;

converting the topic title to the topic constant;

storing the topic constant in the topic record; and storing the topic record in a topic stack.

23. The computer useable medium of claim 21, further comprising program code for deleting a topic record, wherein the program code for performing the step of deleting a topic record further comprises program code for:

accepting user input to display a set of topic titles corresponding to a set of topic records stored in a topic stack;

displaying a topic window;

retrieving the set of topic titles corresponding to the set of topic records;

displaying the set of topic titles corresponding to the set of topic records in the topic window;

accepting user selection of a first topic record from the set of topic records;

updating a set of links between the first topic record and other topic records from the set of topic records in the topic stack;

removing the first topic record from the topic stack; and updating the display to reflect the deletion of the first topic record.

24. The computer useable medium of claim 21, further comprising program code for editing a topic record, wherein the program code for performing the step of editing a topic record further comprises program code for:

selecting a topic record to be edited;

displaying the data contained in the topic record on a display device;

inputting changes to the data contained in the topic record;

storing the inputted changes in the topic record;

determining whether a link of the selected topic was changed;

determining whether a topic title of the selected topic was changed; and changing link references within other records in a topic stack if the topic title or link of the selected topic was changed.

25. The computer useable medium of claim 21, further comprising a program code for creating a link between a first topic record and a second topic record, wherein the program code for performing the step of creating a link further comprises program code for:

selecting the first topic record;

displaying a link options window;

inputting options for the link between the first topic record and the second topic record;

storing the options in a first links field of the first topic record;

retrieving the second topic record;

updating a second links field of the second topic record; and generating code data for the link between the first topic record and the second topic record.

26. The computer useable medium of claim 21, further comprising program code for changing a link between a first topic record and a second topic record, wherein the program code for performing the step of changing a link further comprises program code for:

selecting the link between the first topic record and the second topic record;

displaying a link options window for the link;

inputting changes to options for the link between the first topic record and the second topic record;

displaying the options changes in the link options window;

storing the options in a first links field of the first topic record;

retrieving the second topic record;

updating a second links field of the second topic record; and generating code data for the link between the first topic record and the second topic record.

27. The computer useable medium of claim 21, further comprising program code for adding an object to a topic record, wherein the program code for performing the step of adding an object to a topic record further comprises program code for:

determining a type of object to be added;

determining a string associated with the object to be added;

displaying a dialog box with options corresponding to the type of object to be added;

storing a reference to the object in the topic record;

formatting the string associated with the object according to the type of the object; and updating a display of the string associated with the object with the formatting.

28. The computer useable medium of claim 21 further comprising program code for:

inputting a table name, and table options;

creating a table record with the table name and the table options;

inputting data for the table;

specifying a last cell of the table; and storing the table record in a table stack.

29. A computerized authoring system providing an interactive environment for creating a help system compatible with a plurality of different platforms, the authoring system comprising:

a display device for displaying information from the system, the display device having an input;

an input device for inputting information to the system, the input device having an output;

a memory having inputs and outputs for storing data, the memory including the set of topic records;

means for displaying the set of topic records;

means for creating a help system from the topic records wherein the topic records are created separate from an application program using the topic records, each of said topic records including a build tag field for storing a value to identify corresponding compatible platforms in order to provide functionality to the plurality of different platforms;

a processing unit for controlling the means for displaying and the means for generating, the processing unit coupled to the display device, the input device, and the memory.

30. A computer implemented method for creating a help system compatible with a plurality of different platforms, the method comprising the steps of:

creating a topic record separate from an application program using the topic records;

accepting data for the help system from a user;

storing the data in the topic record;

identifying in the topic record platforms that are compatible with the data;

displaying the data that has been stored;

generating coded data, in response to the stored data; and producing the help system using a code generator and the coded data as input to the code generator.

* * * * *